United States Patent
Ashford et al.

(10) Patent No.: US 12,011,111 B2
(45) Date of Patent: Jun. 18, 2024

(54) PORTABLE FIRE PIT AND GRILL ASSEMBLY

(71) Applicant: Entreprises Nolk Inc., Saint-Bruno-de-Montarville (CA)

(72) Inventors: Maxwell Ashford, Bredfield (GB); Joseph Hofer, Kitchener (CA); Theodore George Rizkalla, Kitchener (CA); Chris Parker, Toronto (CA)

(73) Assignee: Entreprises Nolk Inc., Saint-Bruno-de-Montarville (CA)

( * ) Notice: Subject to any disclaimer, the term of this patent is extended or adjusted under 35 U.S.C. 154(b) by 325 days.

(21) Appl. No.: 17/609,980

(22) PCT Filed: May 8, 2020

(86) PCT No.: PCT/CA2020/050631
§ 371 (c)(1),
(2) Date: Nov. 9, 2021

(87) PCT Pub. No.: WO2020/223823
PCT Pub. Date: Nov. 12, 2020

(65) Prior Publication Data
US 2022/0257054 A1     Aug. 18, 2022

Related U.S. Application Data

(60) Provisional application No. 62/845,348, filed on May 9, 2019.

(51) Int. Cl.
*A47J 37/07*      (2006.01)
*F24B 1/182*      (2006.01)
*F24B 1/20*       (2006.01)

(52) U.S. Cl.
CPC .......... *A47J 37/0763* (2013.01); *F24B 1/182* (2013.01); *F24B 1/205* (2013.01); *A47J 2037/0777* (2013.01); *A47J 2037/0795* (2013.01)

(58) Field of Classification Search
CPC .. F24B 1/182; F24B 1/205; F24C 5/20; F24C 7/10; F24C 1/00; F24C 3/14;
(Continued)

(56) References Cited

U.S. PATENT DOCUMENTS

| 3,682,154 A | 8/1972 | Mollere |
| 4,211,206 A * | 7/1980 | Darbo ................ A47J 37/0763 99/449 |

(Continued)

FOREIGN PATENT DOCUMENTS

| CN | 202234896 | 5/2012 |
| EP | 3315056 B1 | 3/2021 |
| JP | 2001116259 A | 4/2001 |

OTHER PUBLICATIONS

CIPO as International Searching Authority, International Search Report and Written Opinion for PCT/CA2020/050631, dated Jul. 7, 2020.

*Primary Examiner* — Alfred Basichas
(74) *Attorney, Agent, or Firm* — Own Innovation; James W. Hinton

(57) ABSTRACT

A portable base and grill assembly with few parts, that is collapsible, robust, and easily portable and storable is provided. The base includes two parts: a collapsible frame for containing combustion and an insert for holding combustible material including wood and charcoal. The portable grill includes two parts: a collapsible stand and a cooking surface. The cooking surface is a rollable grill that can support cookware or be used to cook food directly. The height of the stand may be adjusted to raise or lower the
(Continued)

cooking surface above a heat source. The portable base, portable grill and cooking surface may each be used as a standalone apparatus or combined and used together as in the assembly. The base and grill assembly may be constructed wholly of stainless steel for durability.

20 Claims, 42 Drawing Sheets

(58) Field of Classification Search
CPC ............ A47J 37/0763; A47J 2037/0795; A47J 2037/0777; F23B 20/00
See application file for complete search history.

(56) References Cited

U.S. PATENT DOCUMENTS

| | | | |
|---|---|---|---|
| 5,495,845 A * | 3/1996 | Hait ........................ | F24C 1/02 |
| | | | 126/29 |
| 5,711,210 A | 1/1998 | Kaufman | |
| 5,785,046 A * | 7/1998 | Colla ...................... | F24B 1/202 |
| | | | 126/25 R |
| 10,132,503 B2 * | 11/2018 | Probst ..................... | F24B 1/00 |
| 10,143,334 B2 * | 12/2018 | Despain ................... | A47J 33/00 |
| D844,359 S * | 4/2019 | Hofer ....................... | D7/332 |
| 11,439,274 B2 * | 9/2022 | Battel ................. | A47J 37/0763 |

\* cited by examiner

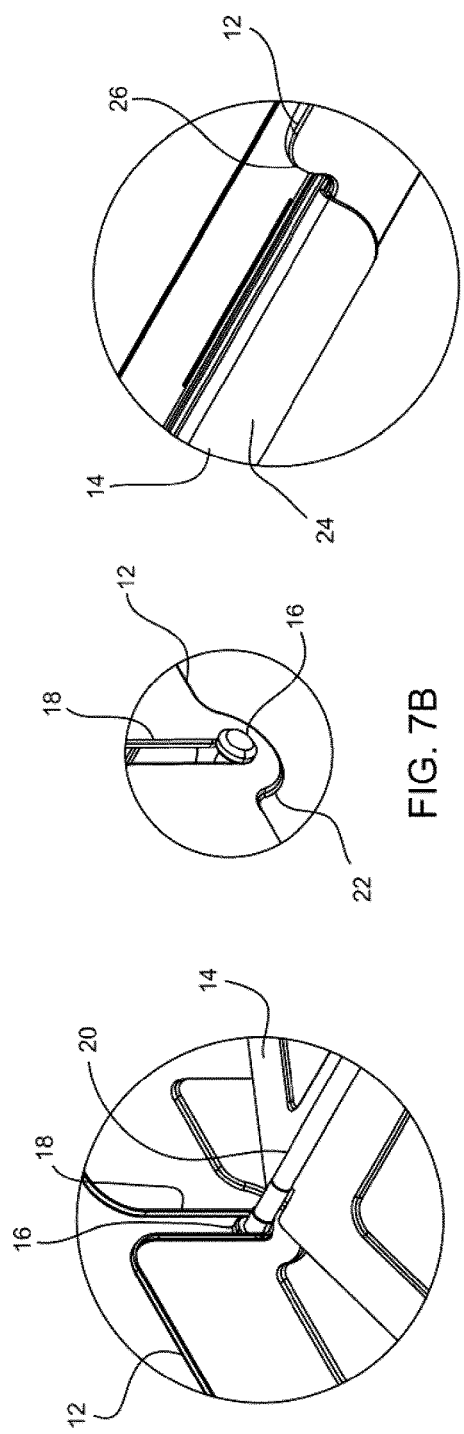

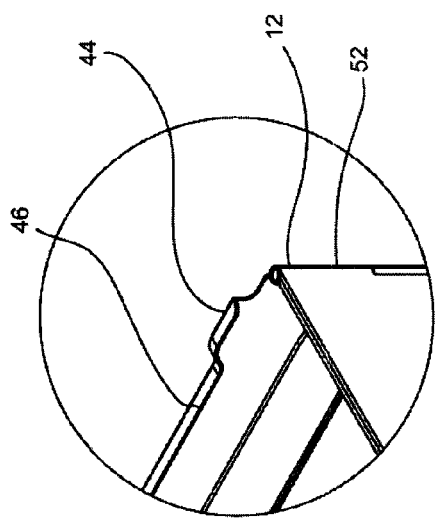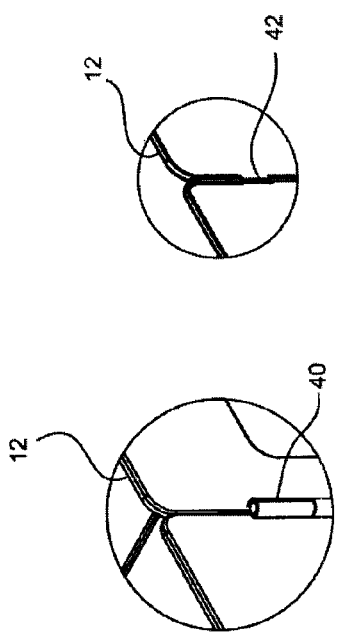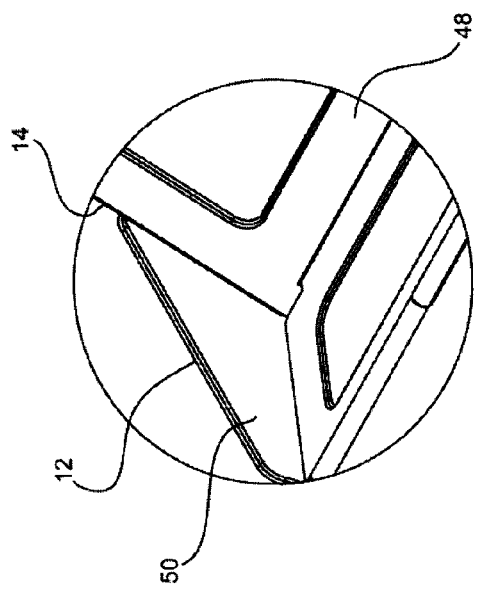

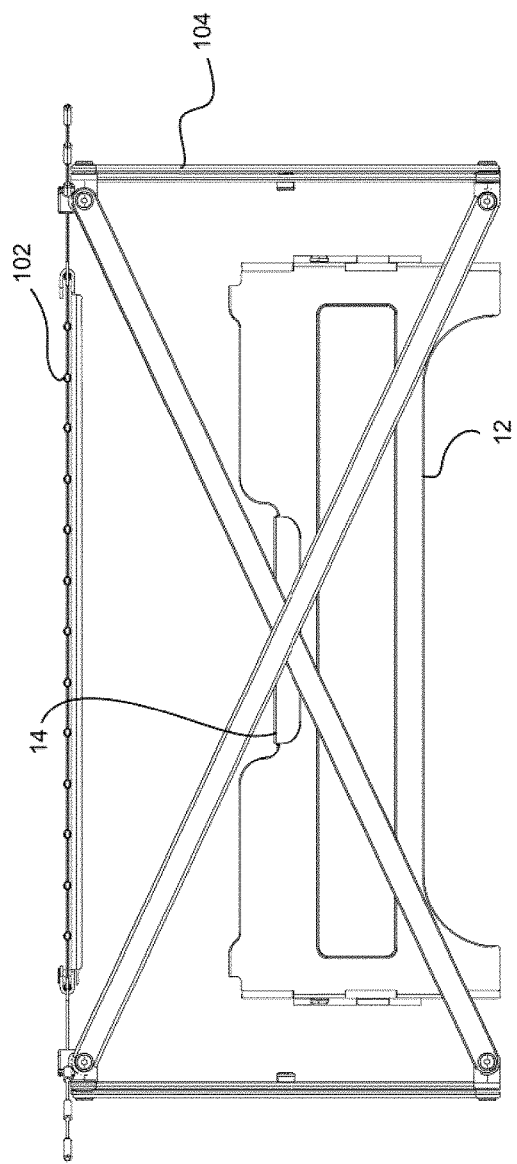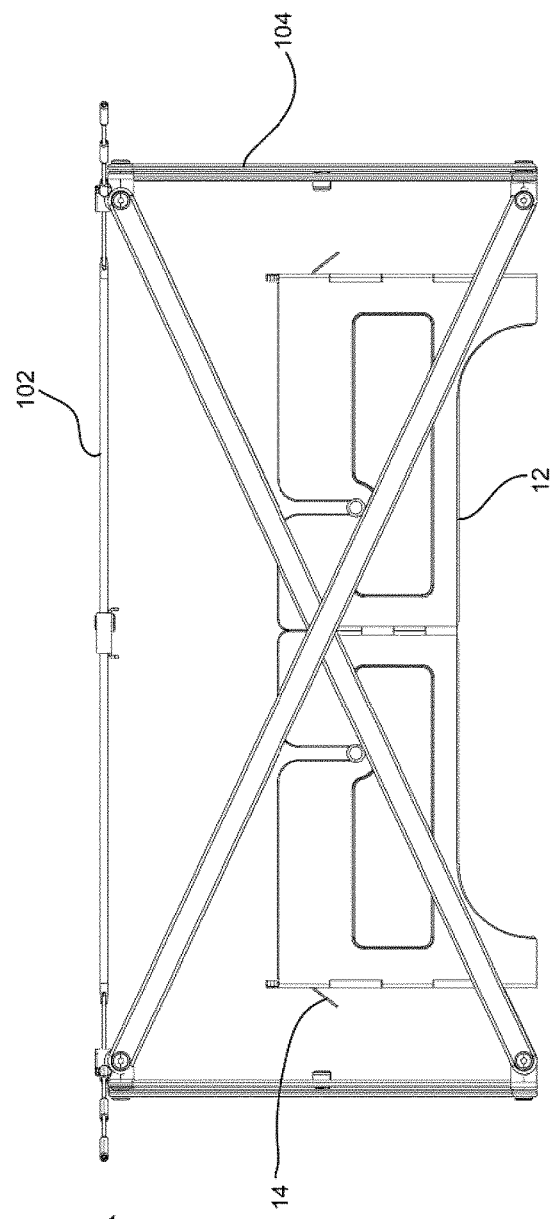

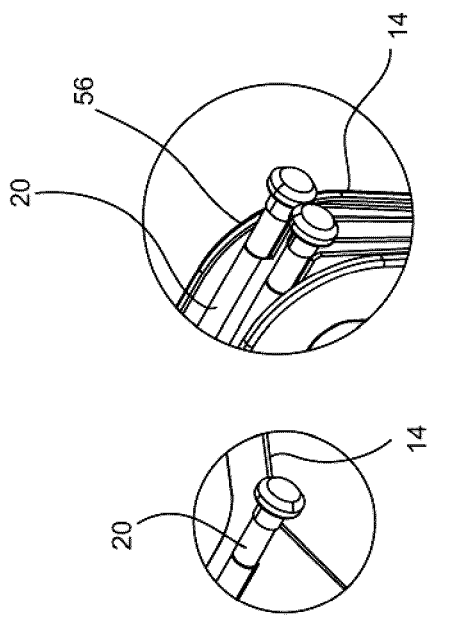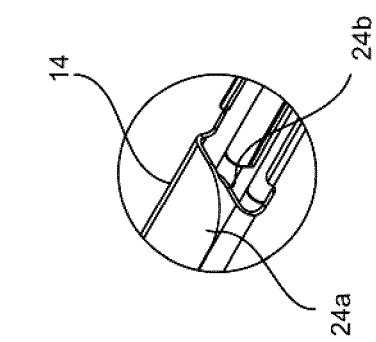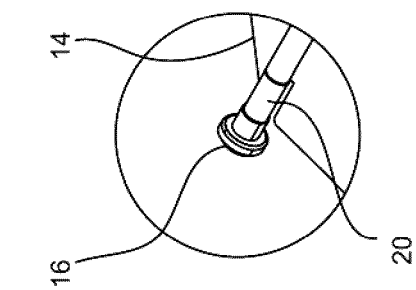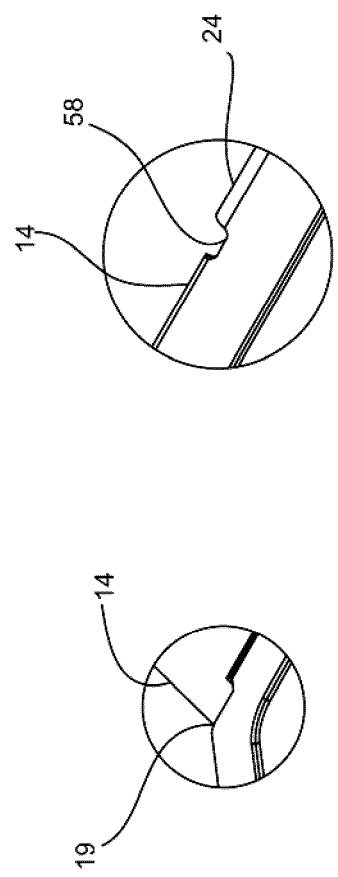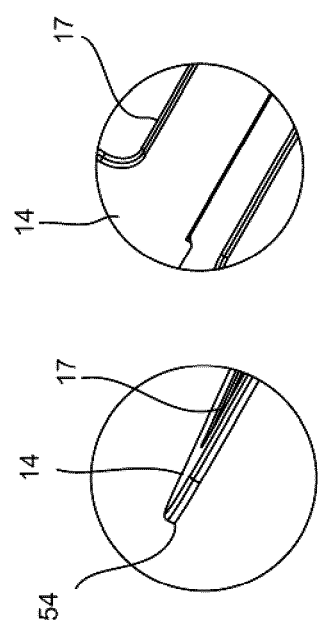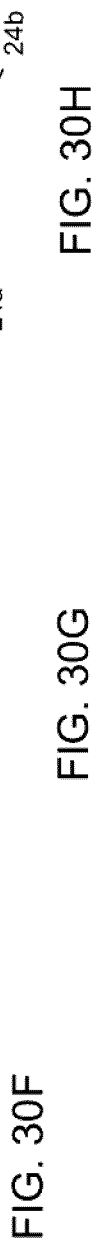
FIG. 30E
FIG. 30H
FIG. 30D
FIG. 30C
FIG. 30G
FIG. 30B
FIG. 30A
FIG. 30F

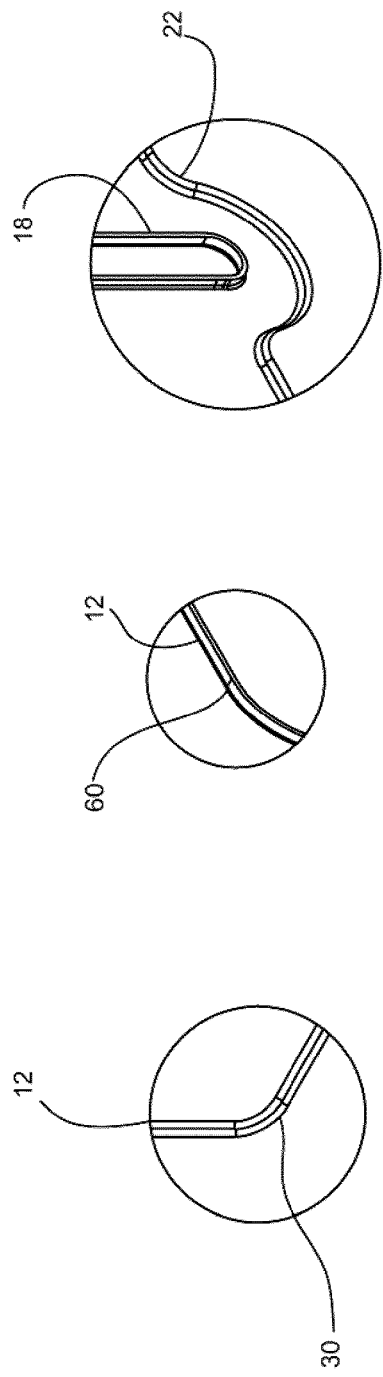
FIG. 41C
FIG. 41B
FIG. 41A
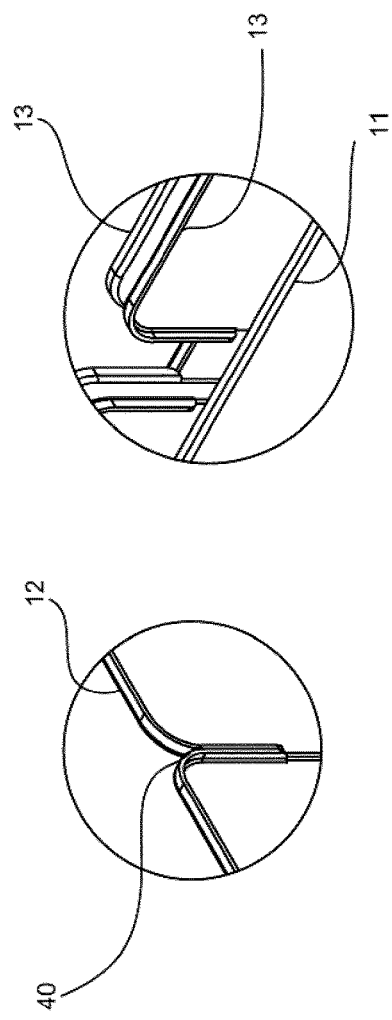
FIG. 41E
FIG. 41D

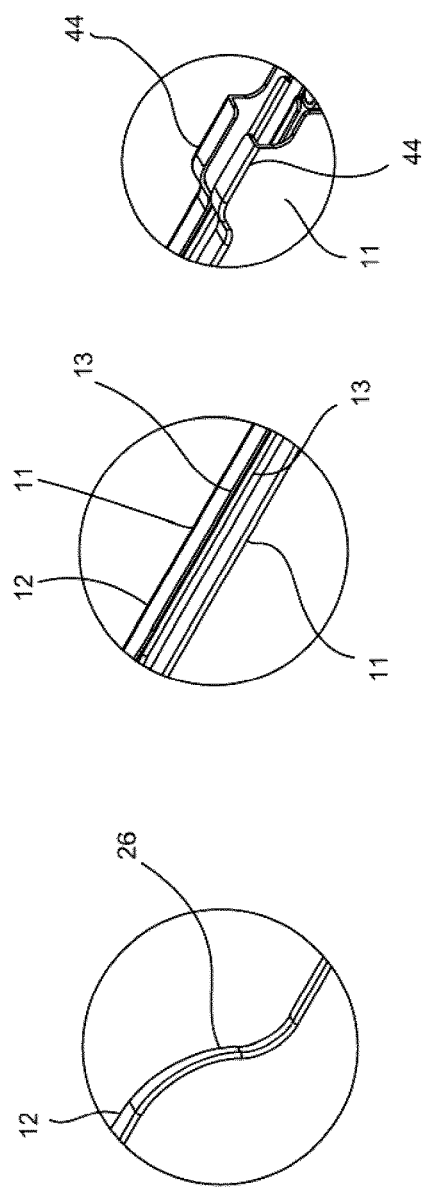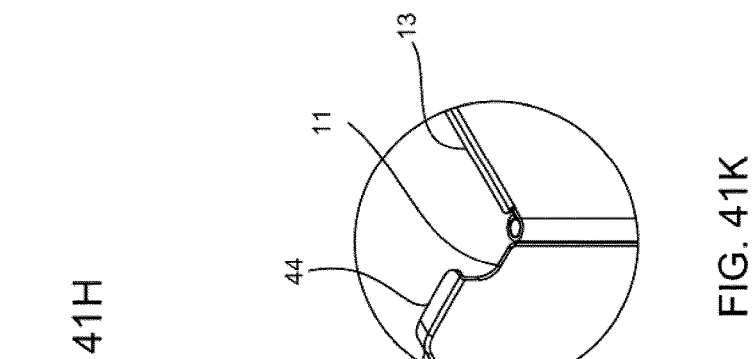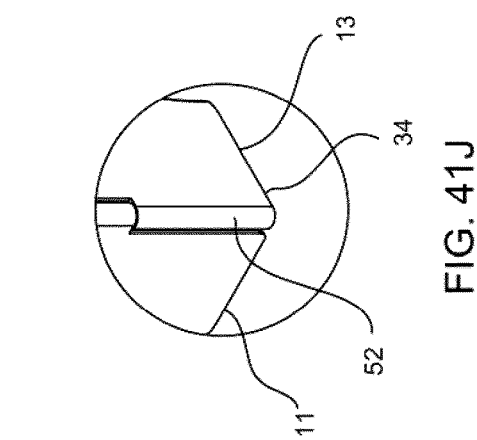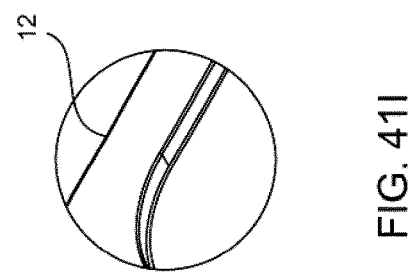
FIG. 41F  FIG. 41G  FIG. 41H
FIG. 41I  FIG. 41J  FIG. 41K

PORTABLE FIRE PIT AND GRILL ASSEMBLY

TECHNICAL FIELD

The embodiments disclosed herein relate to fire pits and grill apparatus, and, in particular to portable, self-contained base and grill apparatus for cooking and heating.

INTRODUCTION

Fire pits are traditionally heavy, cumbersome and not easily portable or storable. Existing portable grills often include numerous parts that must be assembled to setup the grill and disconnected to collapse the grill. This is time consuming and can lead to parts being lost. Furthermore, existing portable grills are not adjustable to vary the height of the cooking surface of the grill in relation to the heat source. Thus, these grills cannot be adjusted to account for variations in heat/fire conditions and different cooking techniques. Accordingly, there is a need for a fire pit and grill apparatus with few parts, that is collapsible, robust, and easily portable and storable.

SUMMARY

According to some embodiments, there is a portable base. The base includes two parts: a collapsible frame and a collapsible insert. The collapsible frame includes opposable front and back walls and opposable side walls attached to the front and back walls by corner hinges. The side walls includes a side hinge wherein, the side walls fold inward at the side hinges to fold flat between the front and back walls when the frame is collapsed.

According to some embodiments, the frame includes cutouts for air circulation to cool the base and prevent heat damage to the ground. According to some embodiments, a top surface of the frame includes lugs for supporting cookware or a cooking surface. According to an embodiment, the front and back walls include notches for receiving the insert. According to an embodiment, the frame includes slot mounts for attaching the insert to the frame.

The insert includes a plurality of insert panels connected by a plurality of hinges, wherein at least two hinges have protruding tips for fitting into the slot mounts thereby removably attaching the insert to the frame. The insert hinges fold alternatively in an accordion fashion to allow the insert panels to lie flat against each other in the collapsed position.

According to an embodiment, the insert includes at least one tip protruding from one of the plurality of hinges, wherein the tip fits into a slot mount on the frame for attaching the insert to the frame.

According to an embodiment, the insert panels are angled with respect to each other in a corrugated fashion to form troughs when the insert is attached to the frame for promoting air circulation for combustion and for collecting ash. According to an embodiment the outermost insert panels include handles for grasping the insert. According to some embodiments, the frame and insert include reinforcing folded edges to prevent deformation from heat. According to some embodiments, the frame and insert are constructed entirely of 304 stainless steel.

According to some embodiments, there is a portable grill assembly comprising a portable base and a fuel burner. The fuel burner comprises at least one heating element and a hose for connecting the heating elements to a fuel source.

According to an embodiment, the at least one heating element includes two heating elements and a center joint for connecting the heating elements. According to an embodiment, the fuel burner is collapsible, wherein the fuel burners are pivotably connected to the center joint and fold inward.

According to some embodiments there is a portable grill assembly comprising a portable base and a portable grill. The grill includes a cooking surface and a collapsible stand for supporting the cooking surface. The cooking surface is convertible between a planar configuration for cooking, and a rolled configuration for storage/transport. The height of the stand is adjustable from a collapsed position. The cooking surface includes four corner projections for attaching the cooking surface to the stand.

The stand includes four pairs of scissor arms arranged in a square. Each pair of scissor arms is pivotable at its crossing point and includes two top ends and two bottom ends. The stand includes four bottom corner joints for joining the bottom ends of adjacent pairs of crossed arms. The stand includes four top corner joints for joining the bottom ends of adjacent pairs of crossed arms. Each top corner joint includes a groove in a top surface for retaining the corner projection thereby removably attaching the cooking surface to the stand.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIGS. 7A to 7J are detailed views of the regions of the base of FIG. 6;

FIGS. 8 to 11 are perspective, top, front and side views, respectively, of a portable grill assembly, in accordance with an embodiment;

FIGS. 30A to 30H are detailed views of the regions in FIGS. 28 and 29;

FIGS. 41A to 41K are detailed views of the regions in FIGS. 39 and 40;

DETAILED DESCRIPTION

Figure 1:
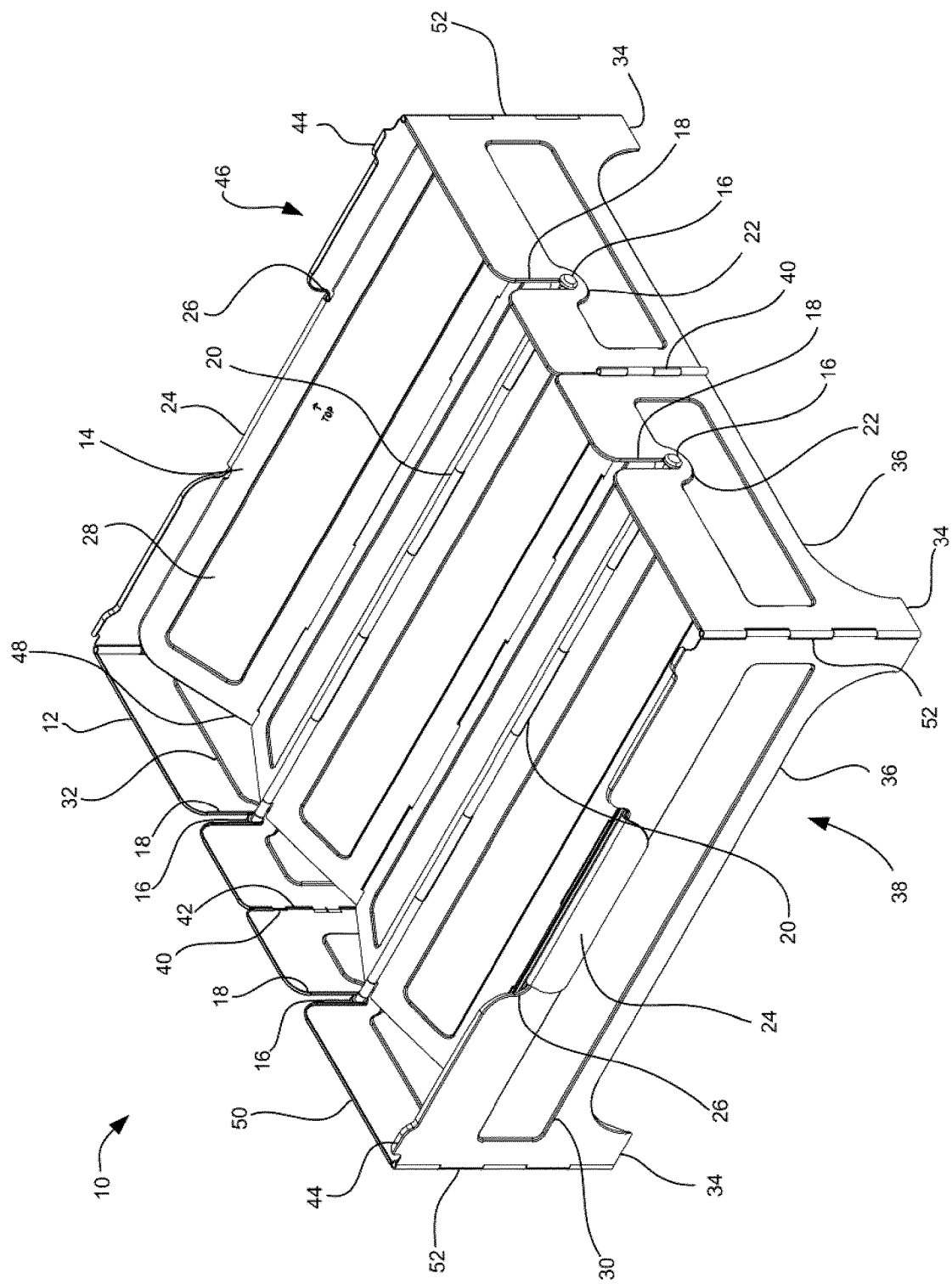
FIGS. 1 to 5 are perspective, top, front, side and exploded views, respectively, of a portable base, in accordance with an embodiment.
Figure 2:
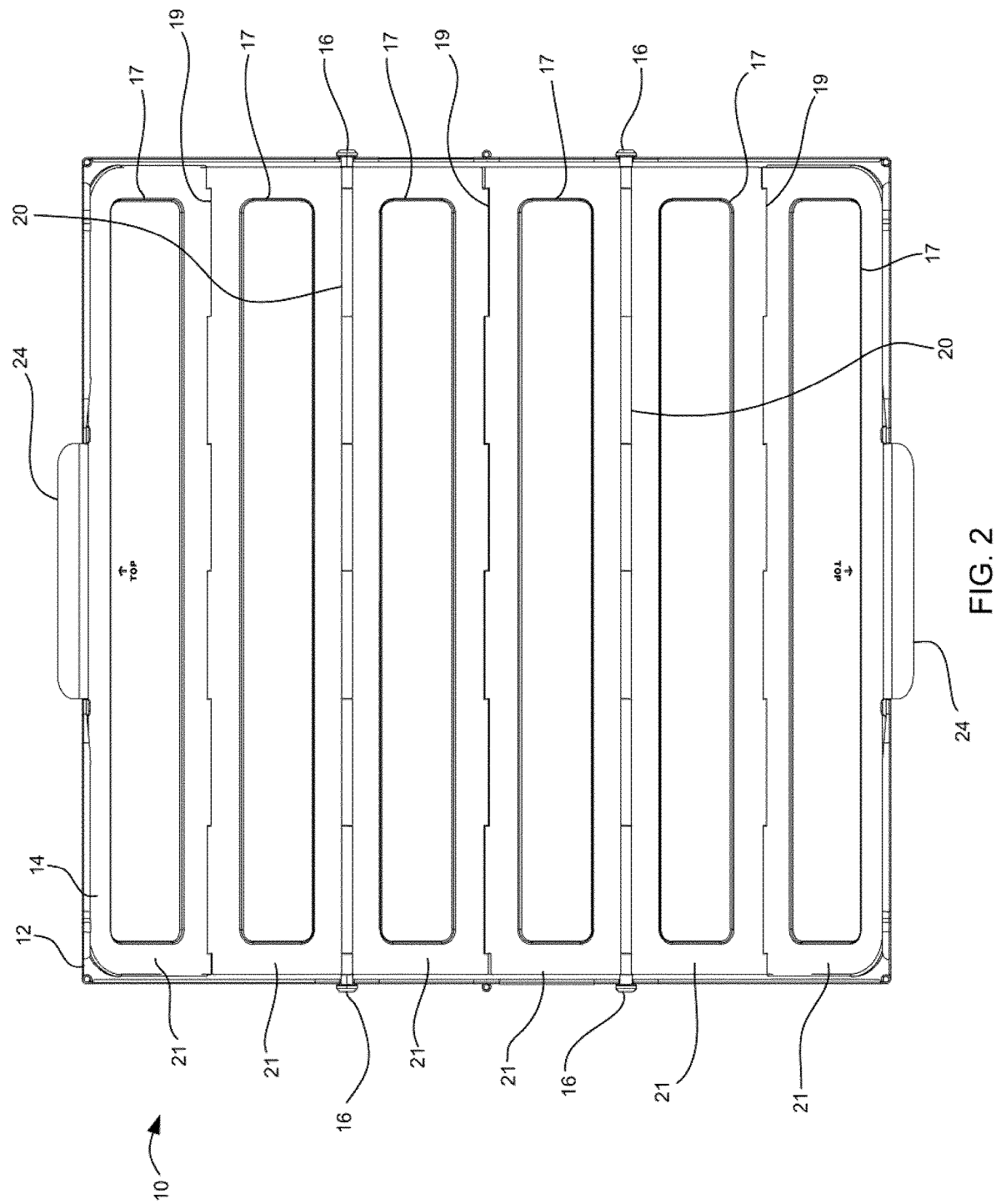
Figure 3:
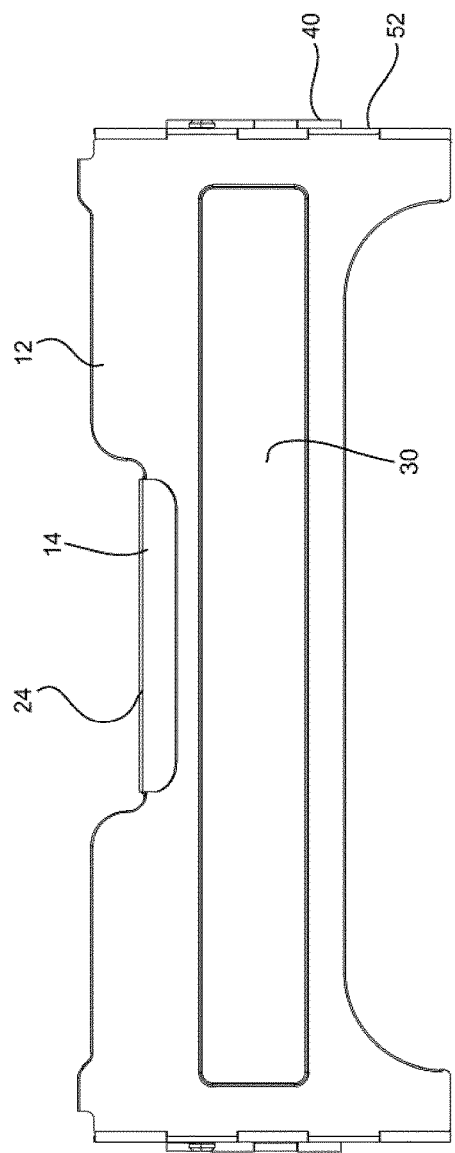
Figure 4:
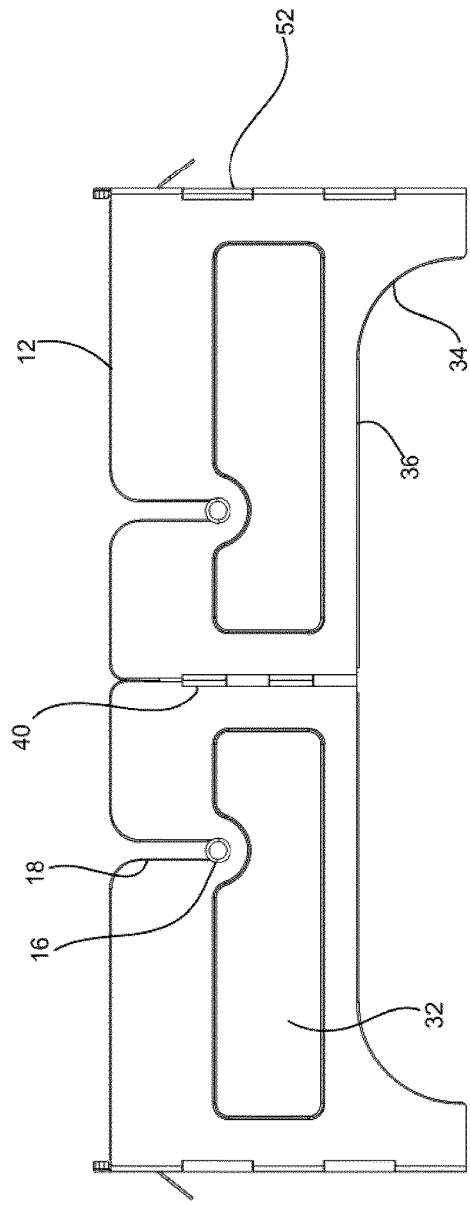

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Referring to FIGS. 1 to 6, illustrated therein is a base 10, in accordance with an embodiment. The base 10 includes only two parts: a frame 12 and an insert 14. The insert 14 holds combustible material (not shown), such as wood or charcoal. The frame 12 supports the insert 14 above the ground to prevent fire and heat damage to the ground below the base 10. The frame 12 further shields the insert 14 (and combustible material held by the insert 14) from wind, thereby aiding in the ignition of the material and combustion. The frame 12 may support a grill (i.e. grill 102 in FIGS. 8-12) for cooking.

The insert 14 is foldable into a compact and closed position. The frame 12 is also foldable into a compact and closed position. The base 10, when folded, may be slim enough to fit into an envelope when in the closed position for compact storage/transportation. The base 10 may weigh less than 1 kg.

The insert 14 includes a plurality of insert panels 21. The insert panels 21 are angled, with respect to the plane of the insert 14, to circulate air for efficient combustion of the heat elements. The insert 14 may fold to be a scooping base for ash collection and disposal so that packing away is efficient and the base 10 remains clean.

The base 10 may be used outdoors, for example in a backyard or in the backcountry. The base 10 may elevate a combustible material, (i.e. wood, charcoal) or a fuel burner, above the ground, in order to eliminate or reduce damage left by campfires or outdoor cooking. The base 10 may be constructed of 100% 304 stainless steel. The base 10 may be corrosion resistant and durable. The base 10 may have quick set up and clean pack down ensures function for every part of the apparatus as described herein. The base 10 may provide clean, efficient burning. The base 10 channels air to the combustible material, making for easy ignition and optimal combustion.

Figure 5:
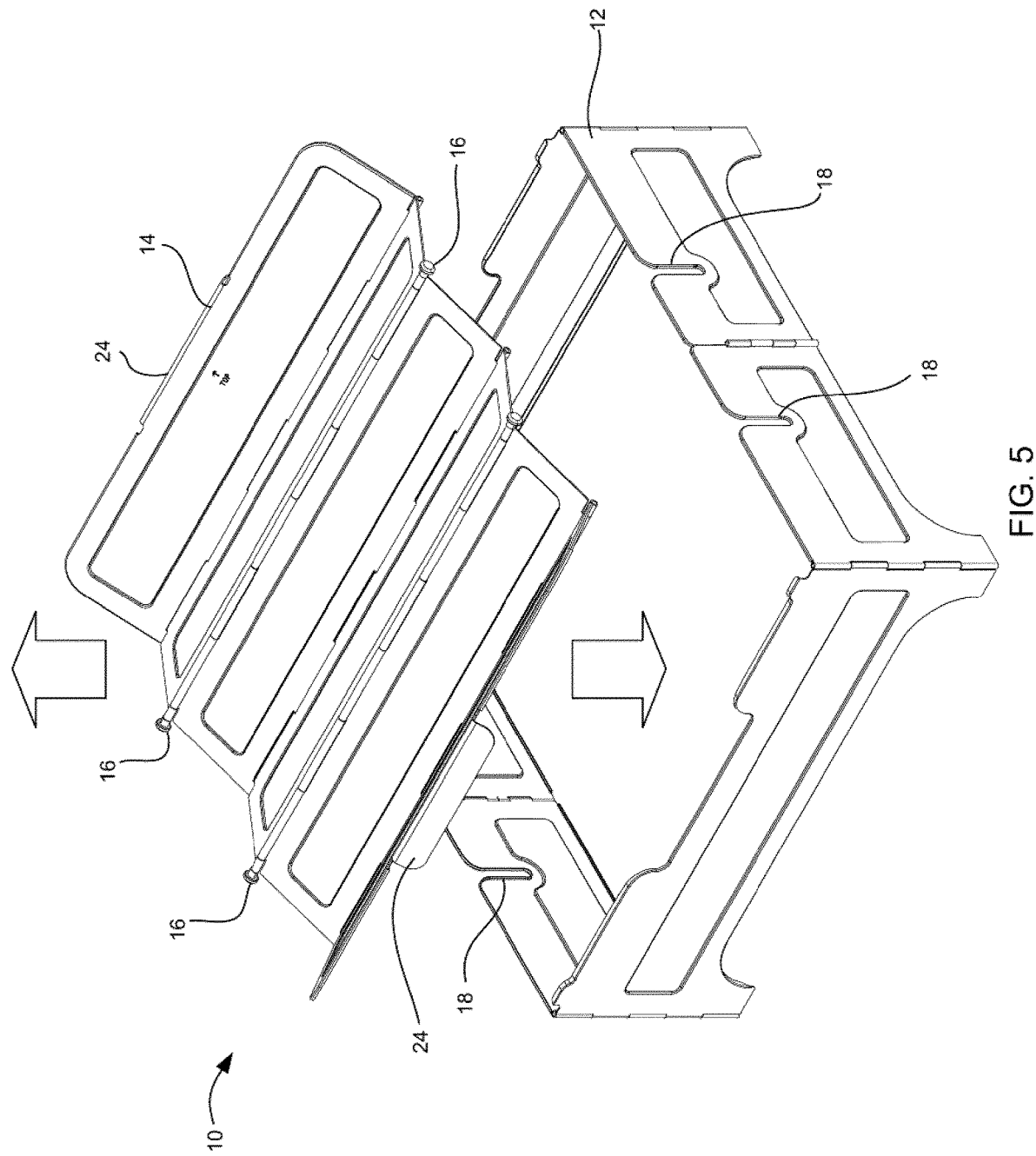
Figure 6:
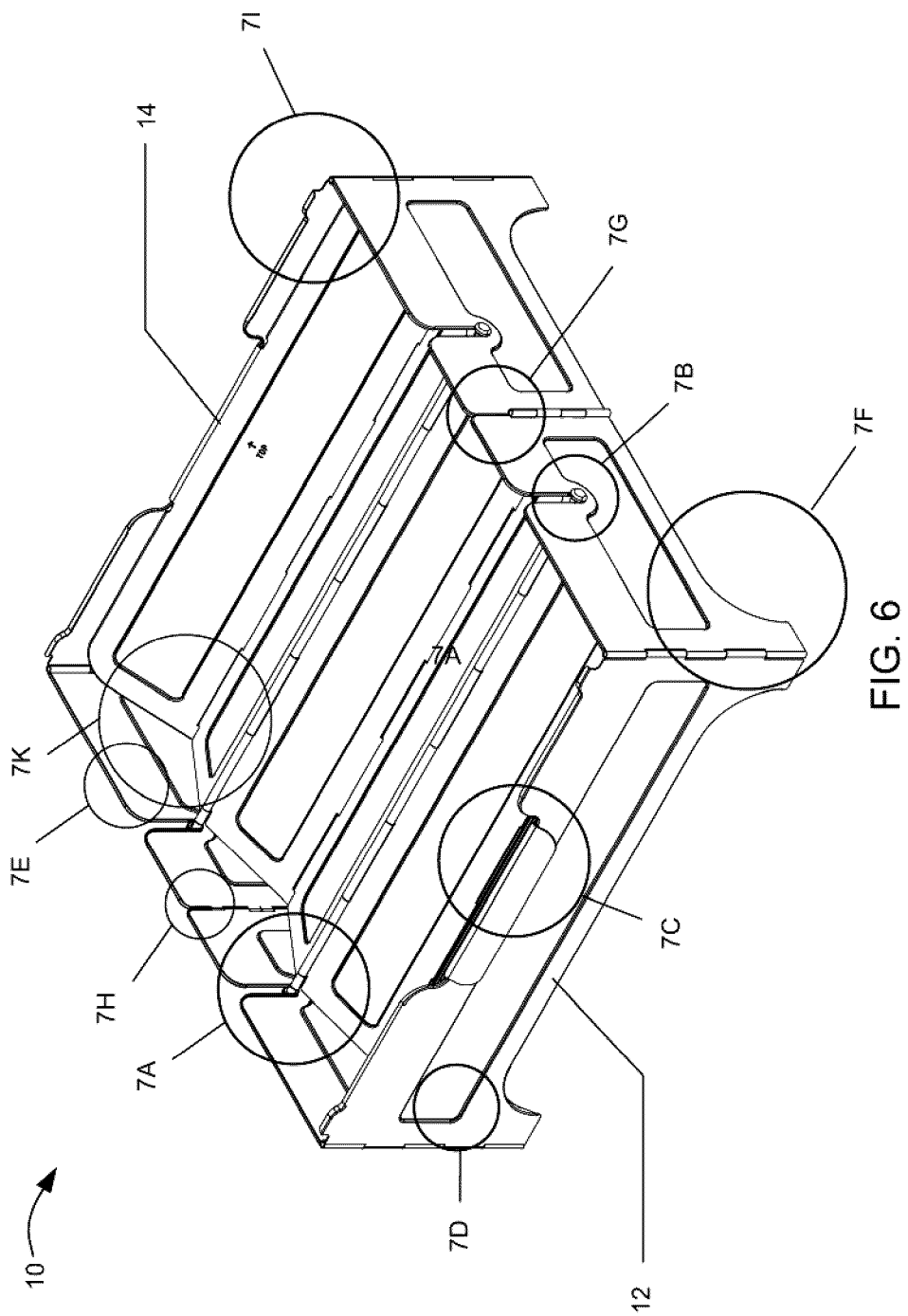
FIG. 6 shows regions of the base of FIG. 1.
Figure 8:
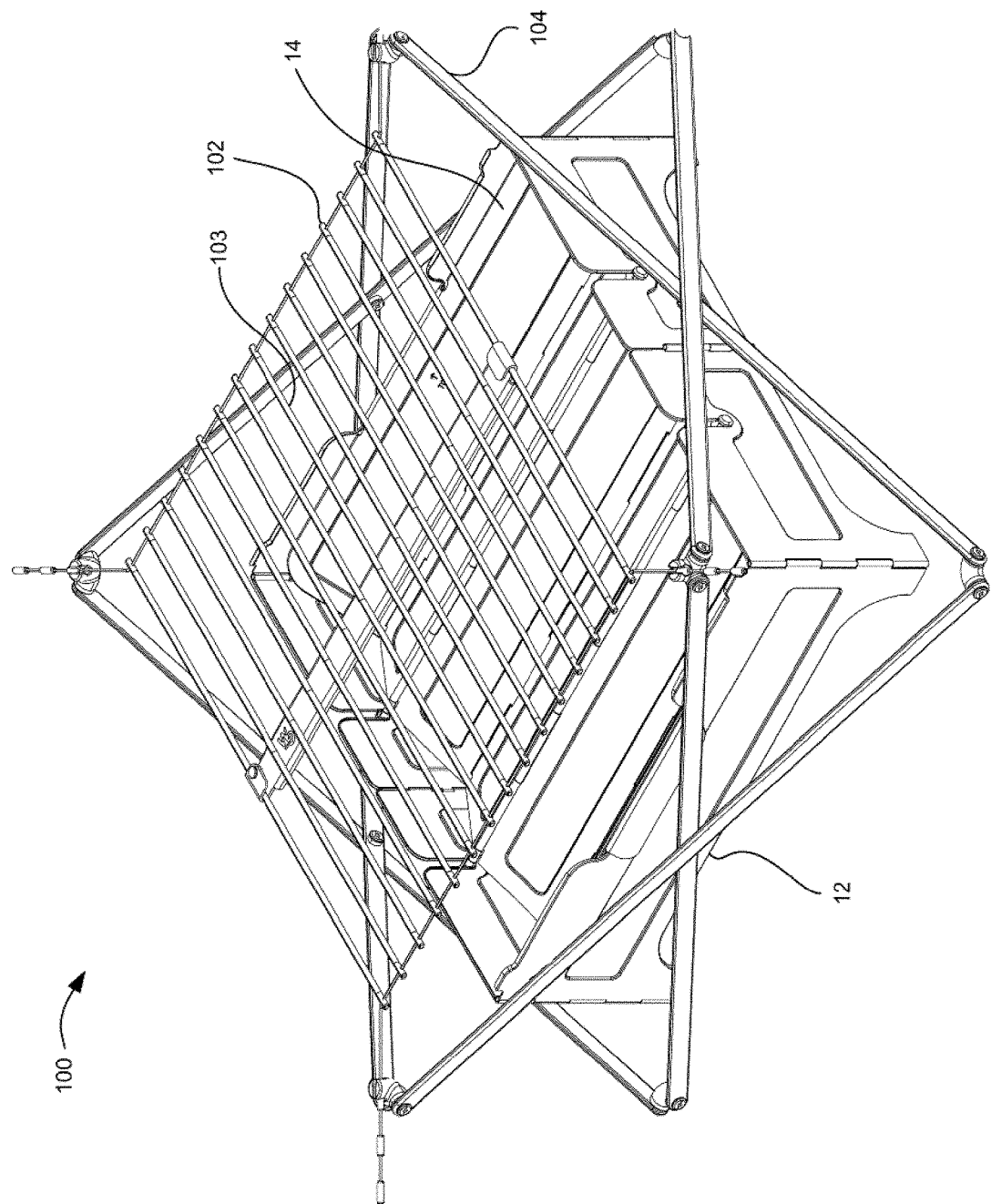
Figure 9:
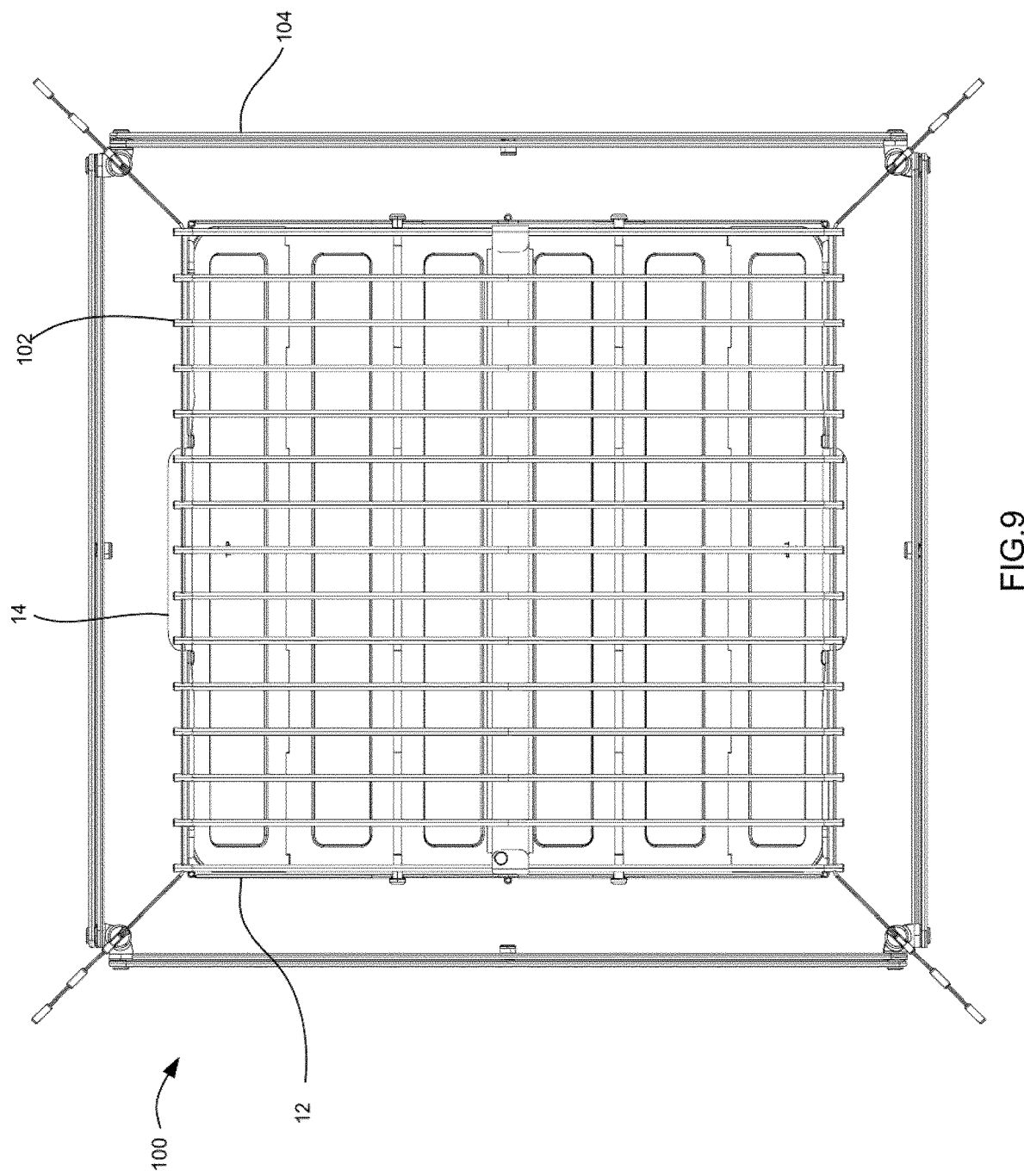
Figure 12:
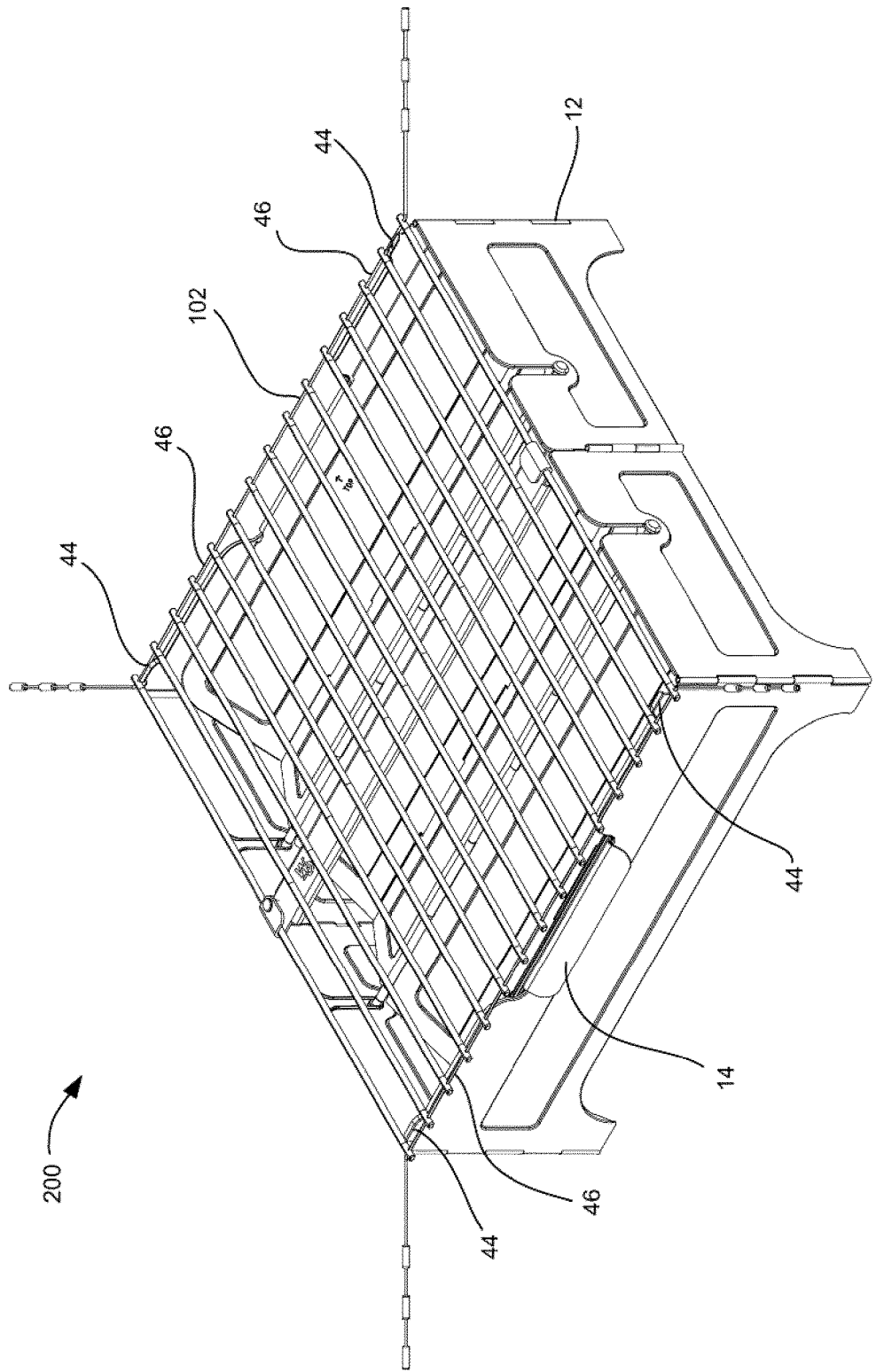
FIGS. 12 to 15 are perspective, top, front and side views, respectively, of a portable grill assembly, in accordance with an embodiment.
Figure 13:
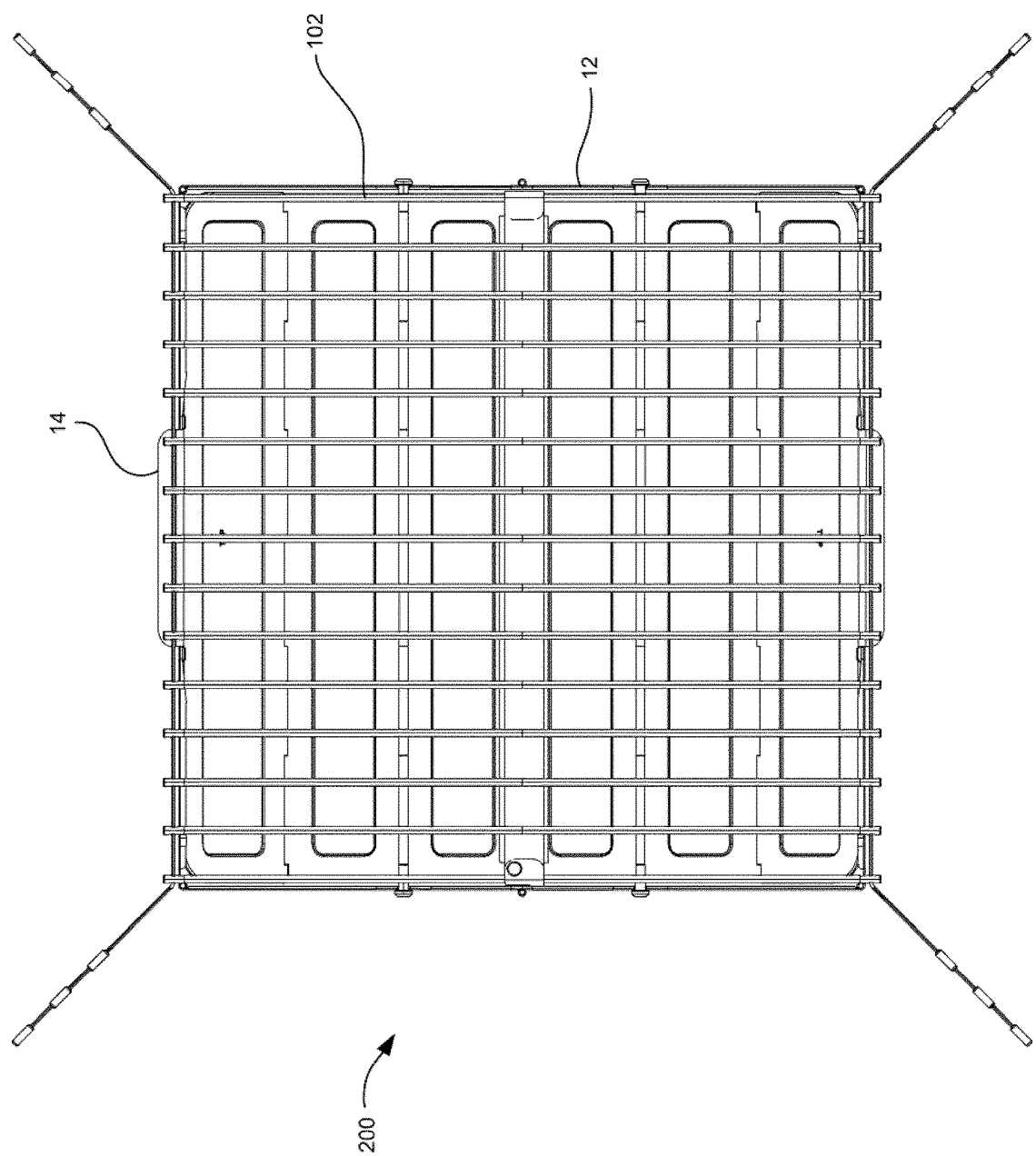
Figure 14:
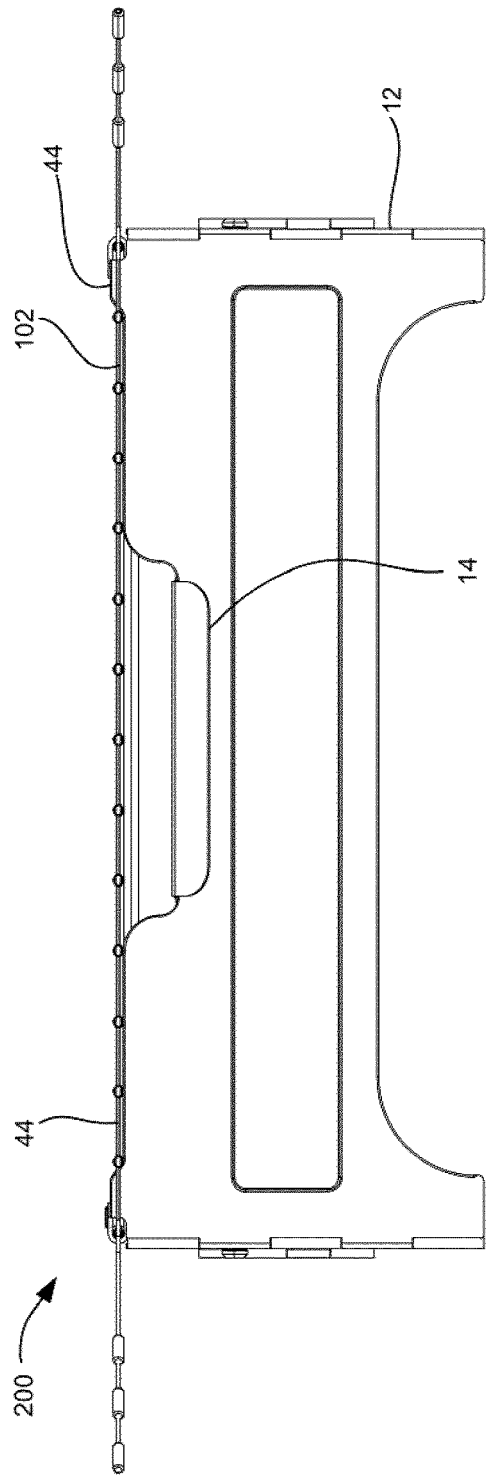
Figure 15:
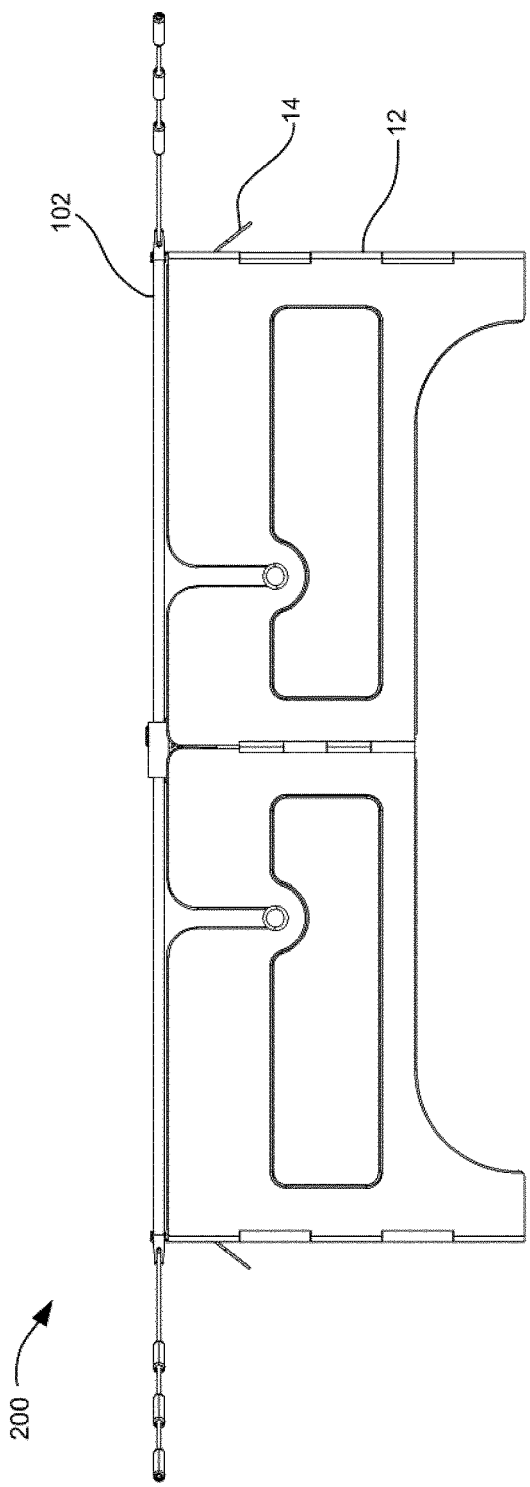
Figure 16:
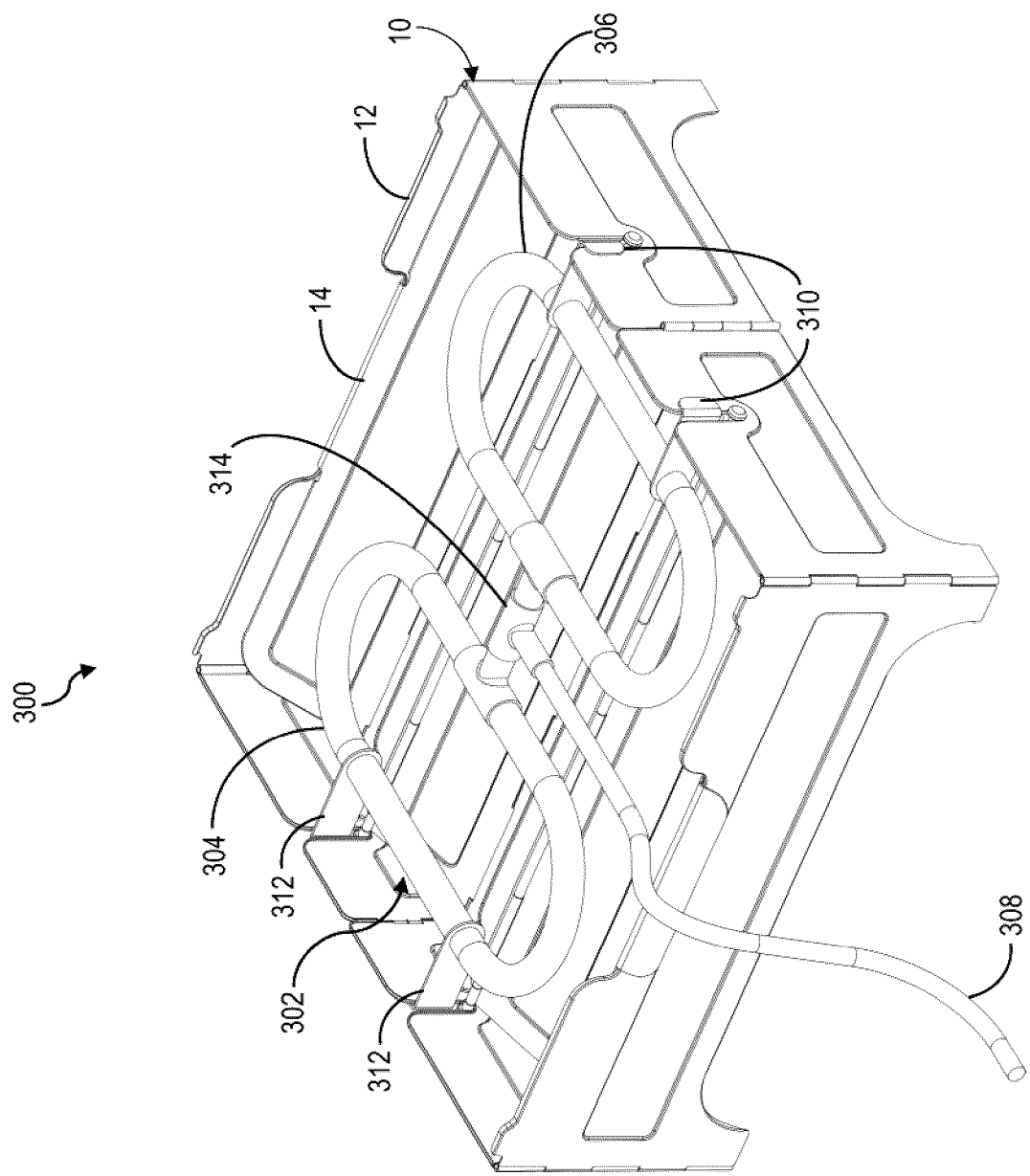
FIGS. 16 to 19 are perspective, top, front and side views, respectively, of a grill assembly, in accordance with an embodiment.
Figure 17:
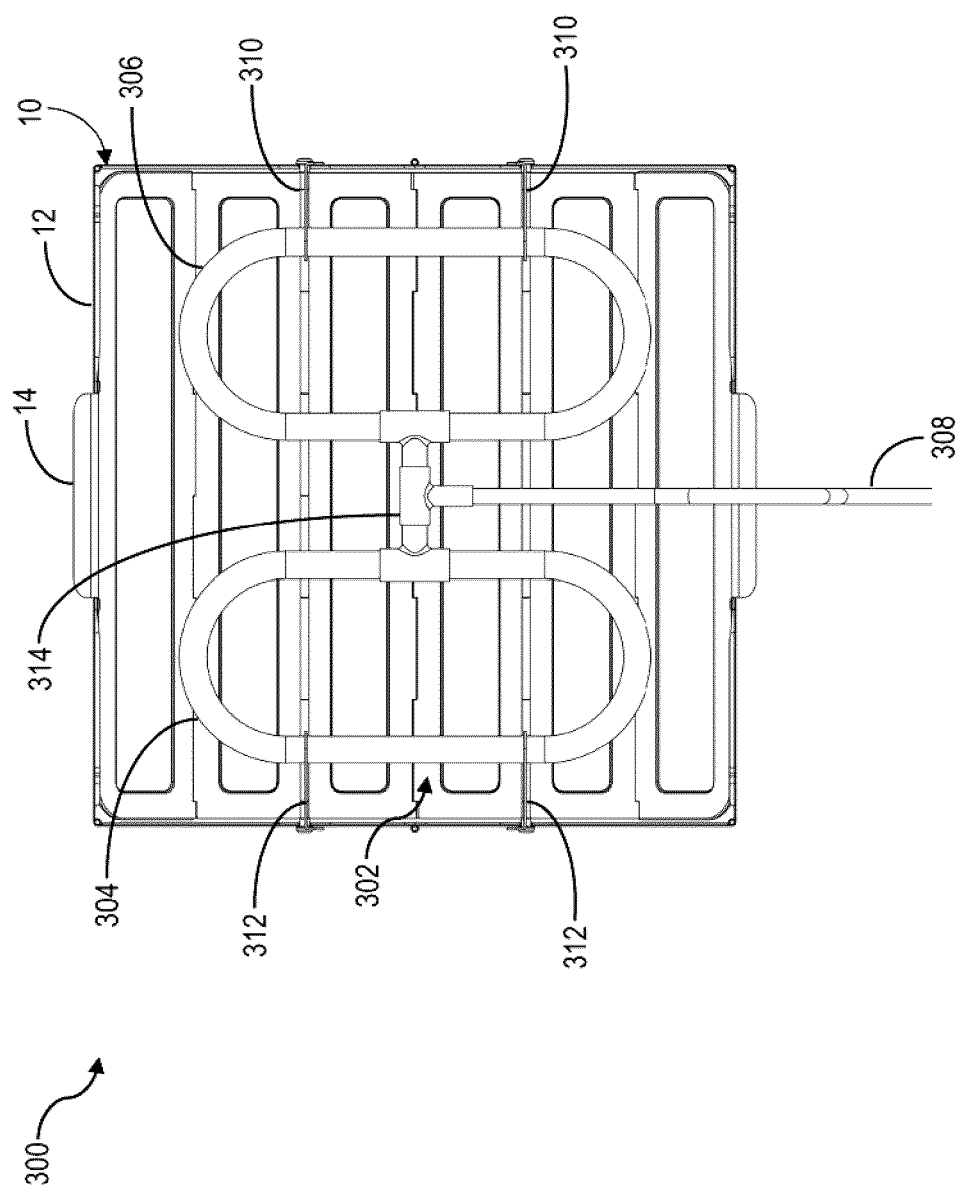
Figure 18:
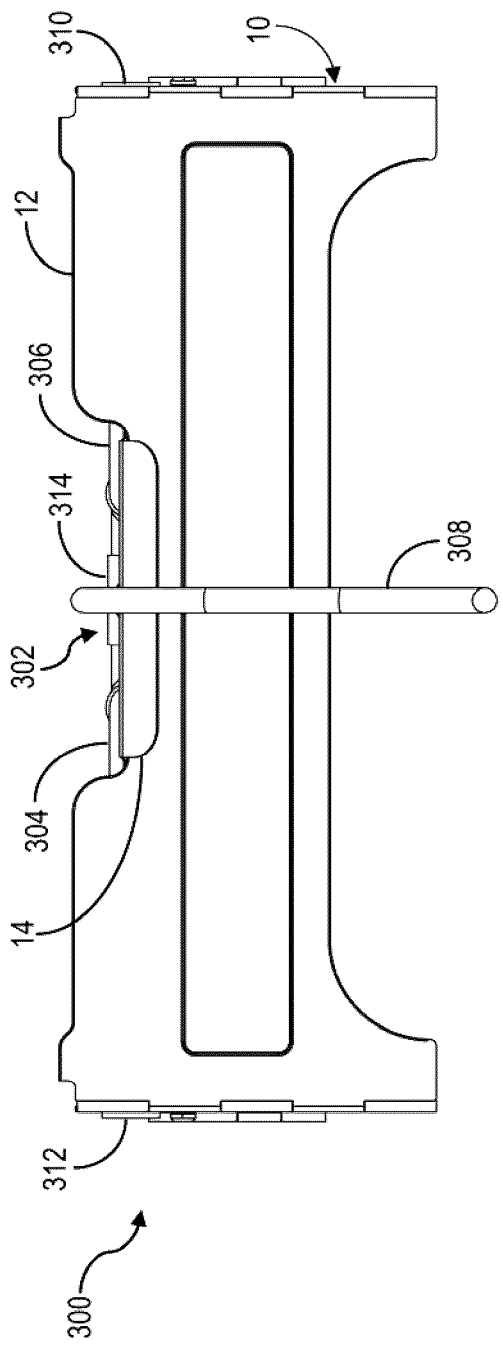
Figure 19:
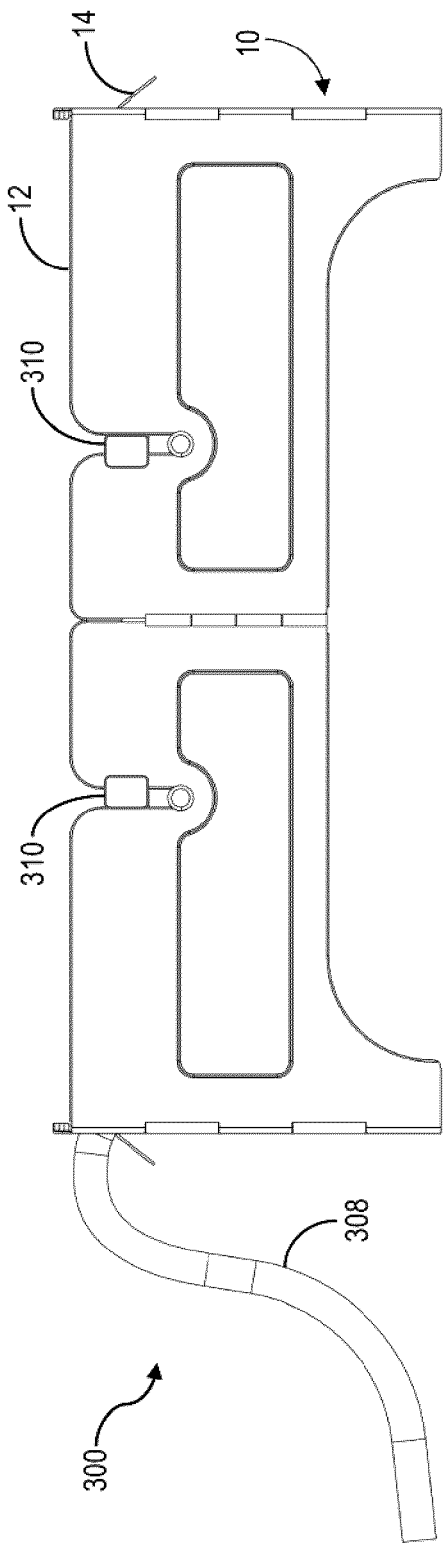
Figure 20:
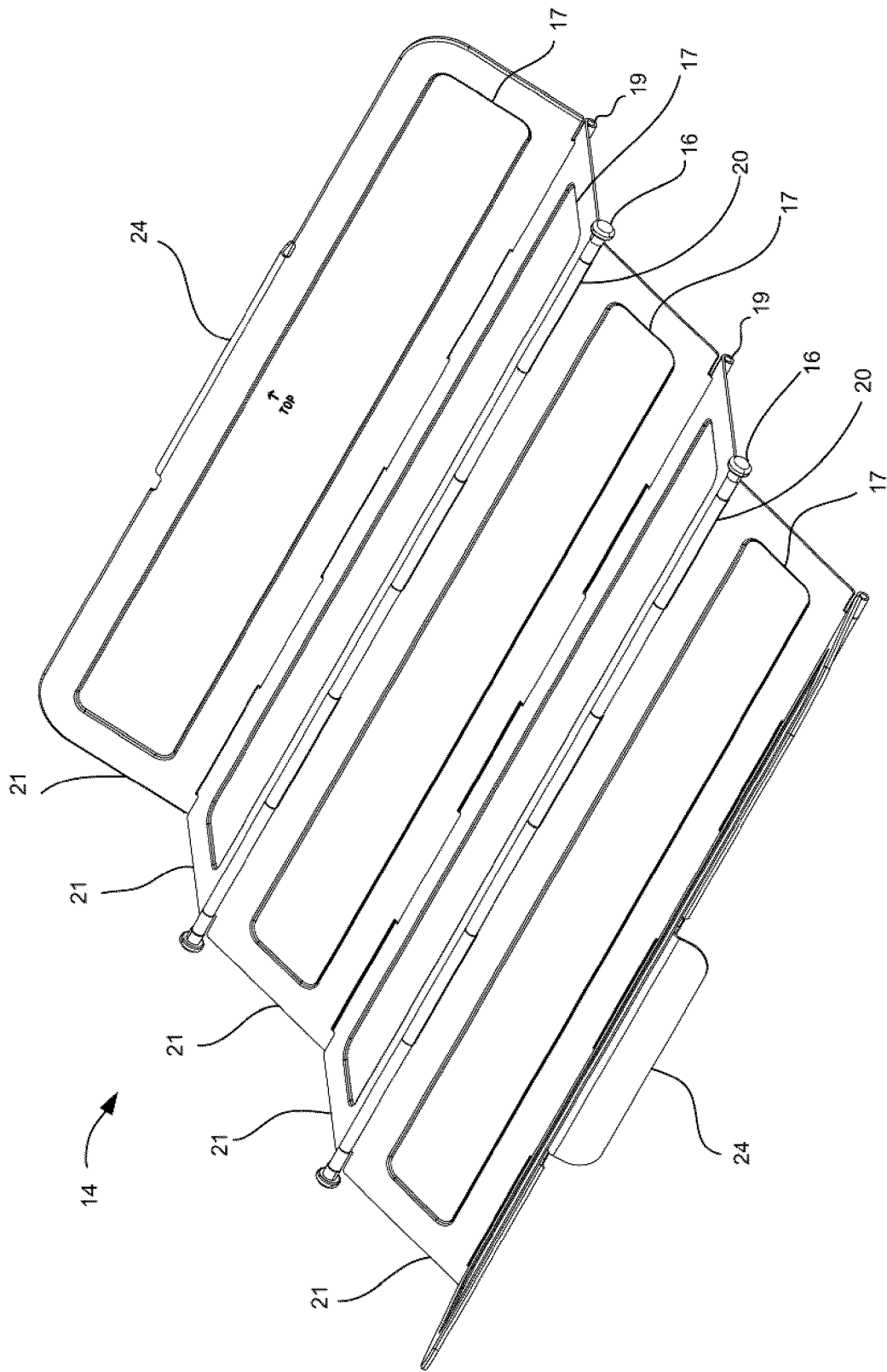
FIGS. 20 to 23 are perspective, top, front and side views, respectively, of the insert of FIG. 1, in an open position.
Figure 21:
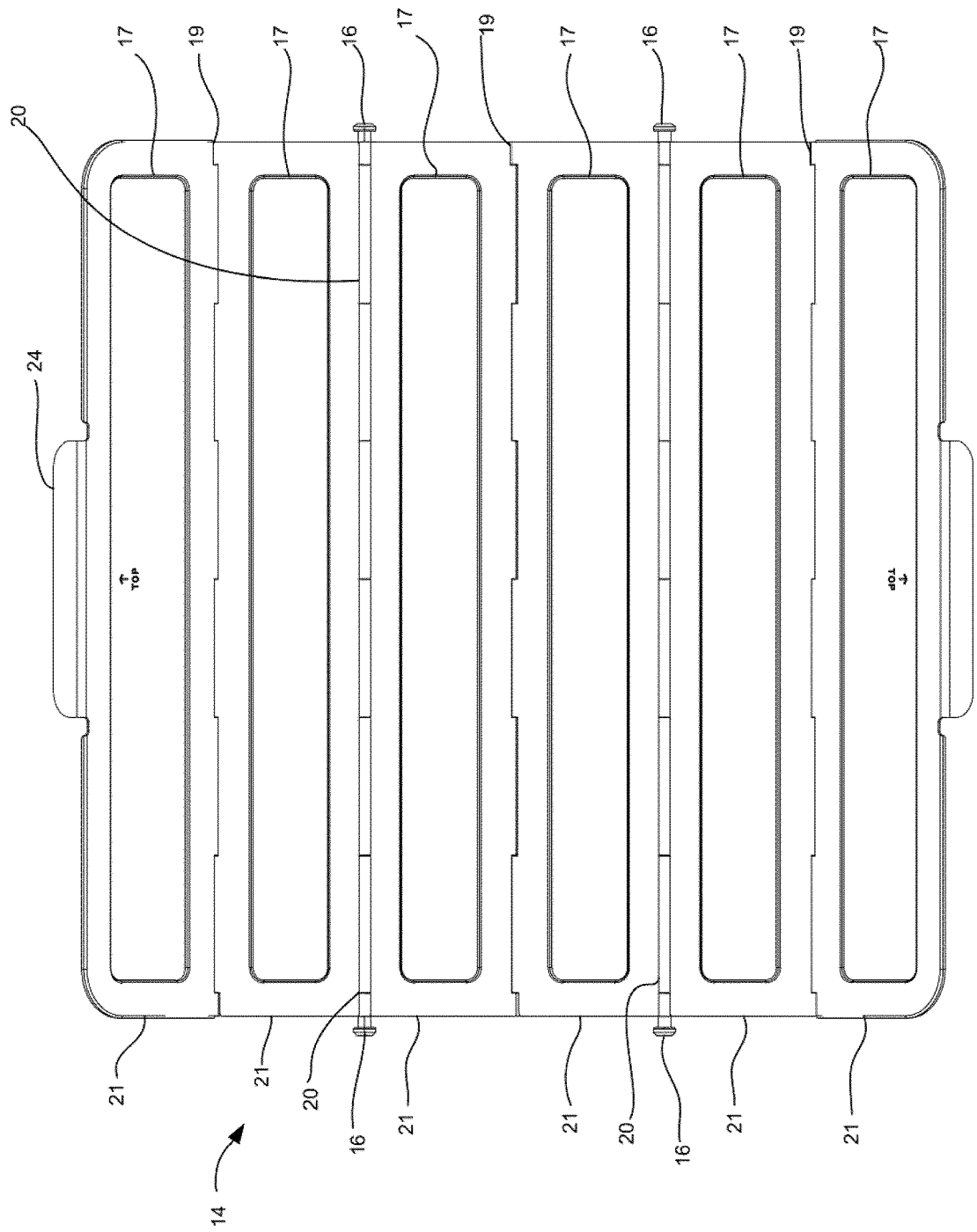
Figure 22:
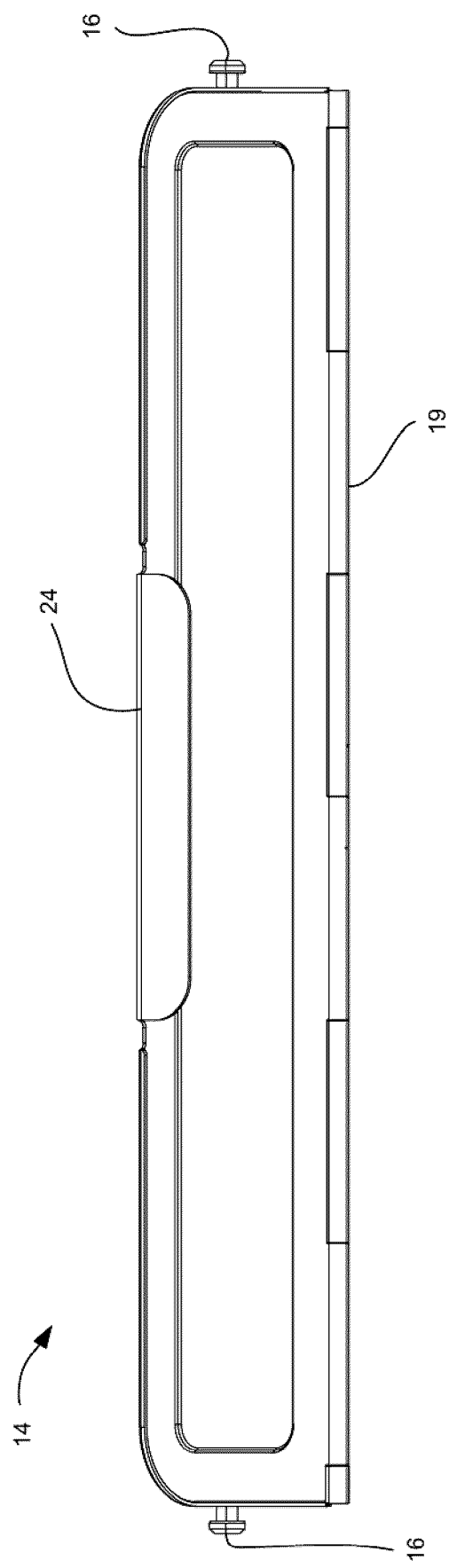
Figure 23:
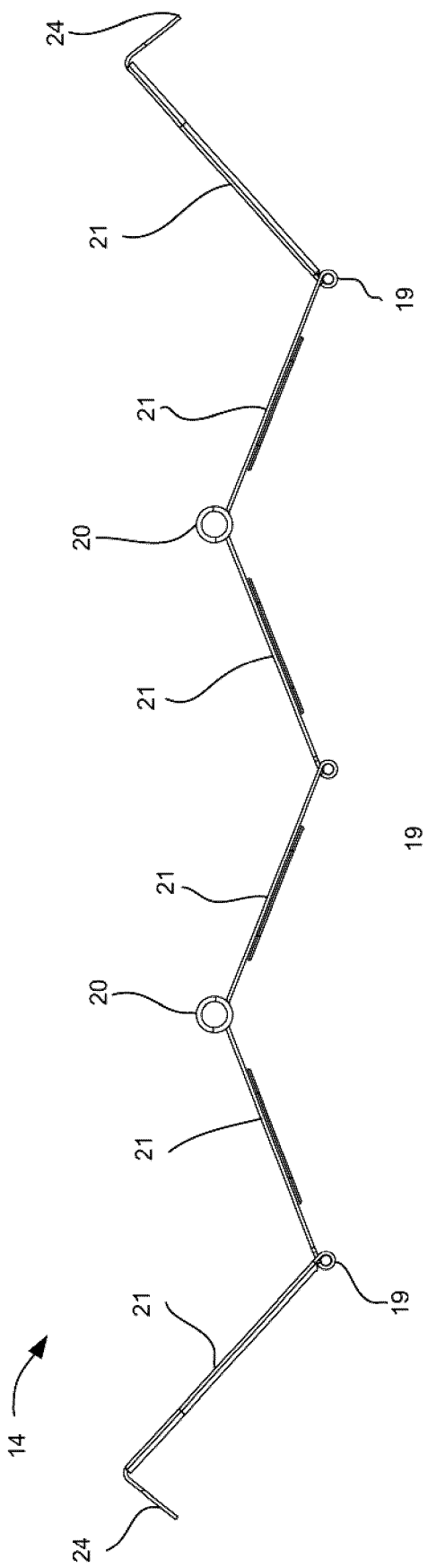
Figure 24:
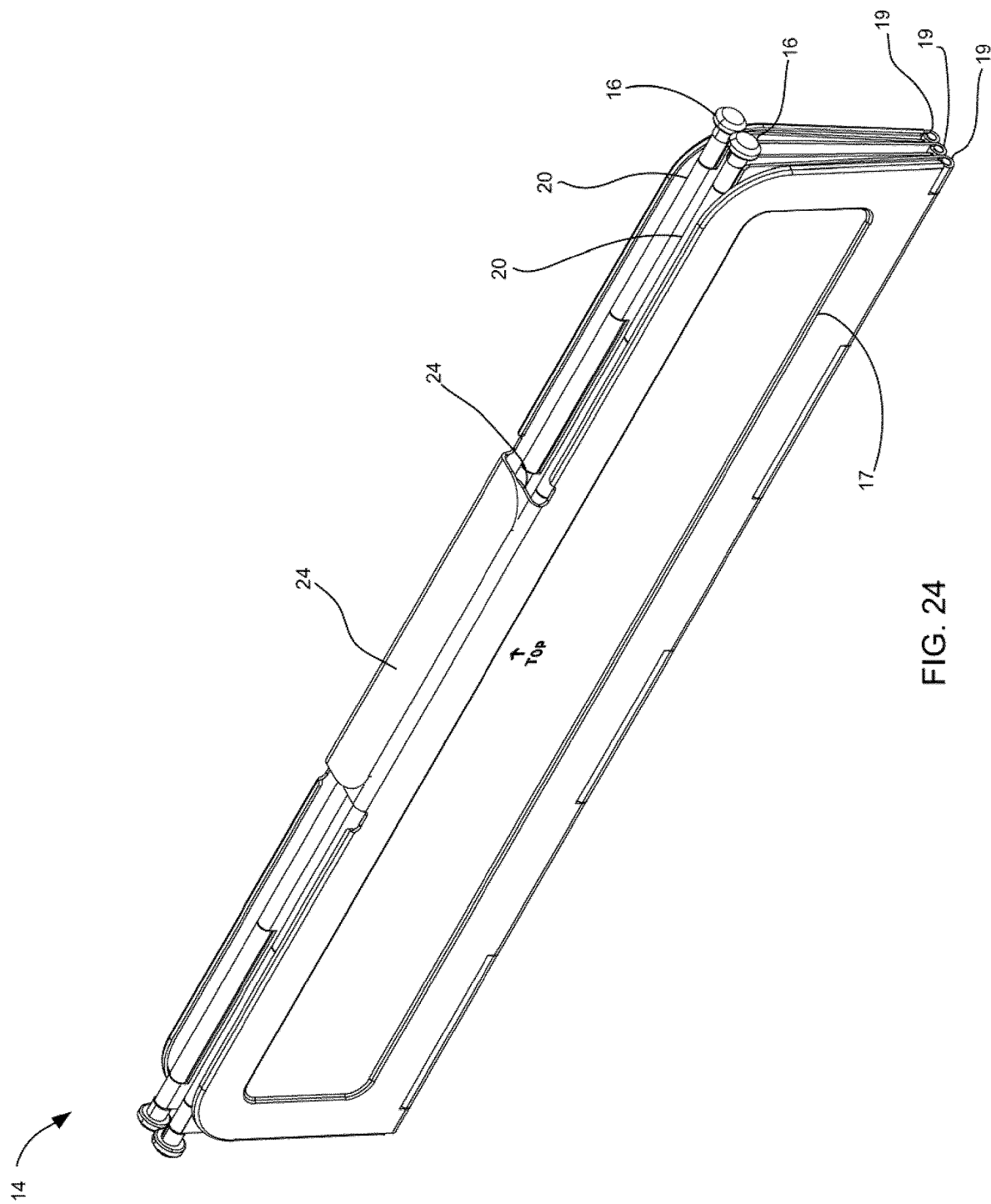
FIGS. 24 to 27 are perspective, top, side, and front views, respectively of the insert of FIG. 1, in a collapsed position.
Figure 26:
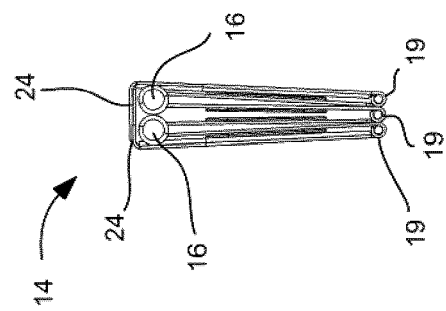
Figure 25:
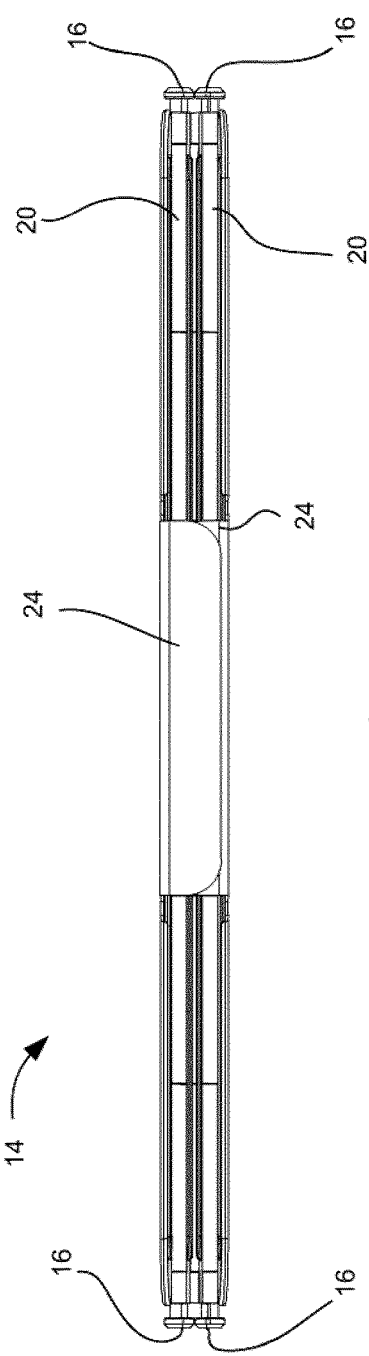
Figure 27:
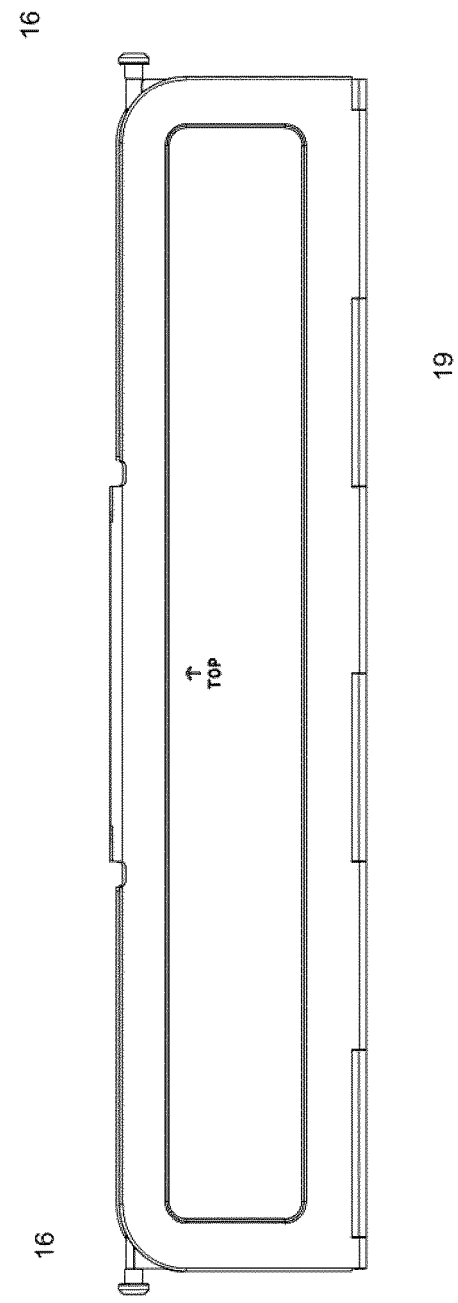
Figure 28:
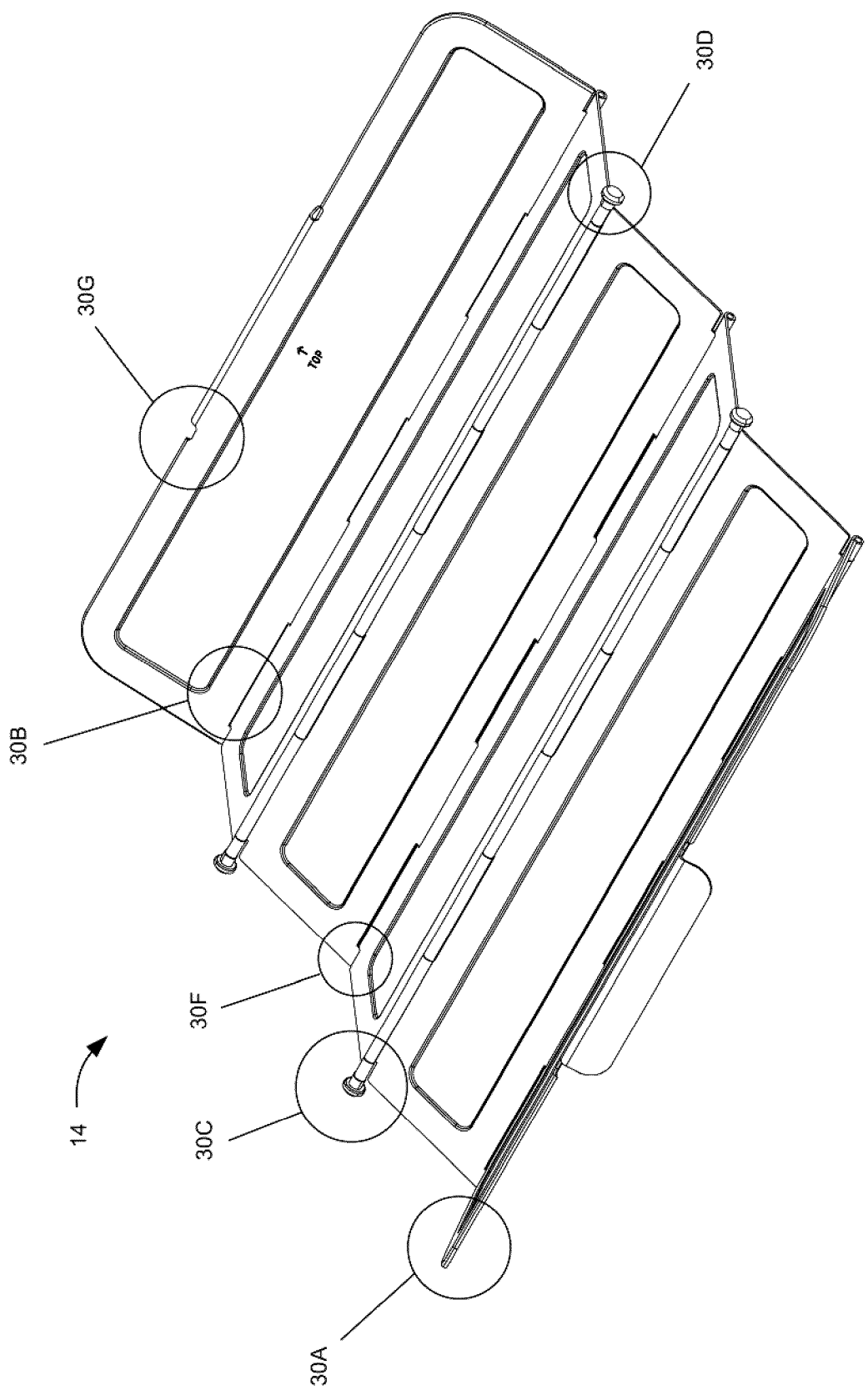
FIG. 28 shows regions of the insert of FIG. 20.

To assemble the base 10, the frame 12 is positioned on the ground, and the insert 14 is guided into the frame 12. The insert 14 is removably attachable to the frame 12, for example as seen at FIG. 5. To remove the insert 14 from the frame 12, the insert 14 is lifted from the frame 12 (e.g., using handles 24).

An advantage of the base 10 compared to existing bases is that there are few (2) parts that must be assembled/disassembled. Furthermore, the attachment of the insert 12 to the frame 12 does not require any tools and may be done easily by hand.

FIGS. 7A, 7B, 7C display the method of attachment for the frame 12 and the insert 14.

FIGS. 7A and 7B display pin 16 and slot mounts 18. The insert 14 includes a plurality of pins 16. The frame 12 includes slot mounts 18 for receiving the pins 16 of the insert 14. Circular pins 16 on the insert 14 align to slots 16 on the frame 12. The pins 16 and the slot mounts 18 provide simple and understandable assembly. The pins 16 and slot mounts 18 structurally support the insert 14. The insert 14 includes two pin hinges 20 that pass between either ends of the pins 16. The pin hinges 20 function to provide hinges to the insert 14.

As shown at FIGS. 2 and 20-27, the insert 14 includes two pin hinges 20 and three fold hinges 19. The insert 14 has six insert panels 21 that support the combustible material. The insert panels 21 are joined alternatively by the fold hinges 19 and the pin hinges 20. The pin hinges 20 are positioned upwards and the fold hinges 19 are positioned downwards with respect to each other. The insert 14 is in a VVV shape, when assembled. The inside of the fold hinges 19 face upward, while the inside of the pin hinges 20 face downward. The insert 14 is foldable to a closed position (see FIGS. 24-26) for compact storage. In the closed position, the hinge pins 20 are adjacent to each other and nestle between the outermost insert panels 21 of the insert 14. The fold hinges 19 are also positioned adjacent to each other in the closed position.

The frame 12 includes a plurality of reinforced edge folds 22 for reinforcing the strength of the frame 12 and the slot mounts 18 (FIG. 7B).

Shown at FIG. 7C, the insert 14 includes two handles 24 for supporting the insert 14 in the frame 12 when the base 10 is assembled. The handle 24 is inserted into a frame cutout 26 of the frame 12. The handle 24 may act as an ergonomic detail for assembly, and provide a clear assembly cue, with the handle 24 locating to the frame cutout 26 in the frame 12. The handles 24 add structural strength to the outer hinge leaves 28 of the insert 14 when assembled.

In disassembly the handle 24 and pin 16 detailing mounting details also allow the insert 14 to collect the contents (i.e. unburnt fuel and/or ashes) on the insert 14 for an easy clean up/pack away after use. The handles 24 are first lifted at each end, making the contents fall to the middle of the insert 14, whereby upon lifting further, the circular pins 16 lift up out of the slot mounts 18.

Shown at FIGS. 7D and 7E the frame 12 includes recesses 30, 32 on the frame 12 as well as the edge fold details. The insert 14 also include recesses 17 (see e.g., FIG. 2). The recesses 30, 32 and edge fold details add structural strength to the sheet metal used, while not interfering with the collapsibility or increasing the weight of the frame 12.

Shown at FIG. 7F, the frame 12 includes four feet 34 for supporting the base 10. The frame 12 includes cutouts 36 around the bottom perimeter 38. The cutouts 36 may allow for air to flow and circulate underneath the base 10, keeping the bottom 38 cooler and reducing damage to the ground surface under the base 10. The feet 34 may provide structural strength from reduced surface contact, again to reduce damage from heat to the ground surface.

Figure 35:
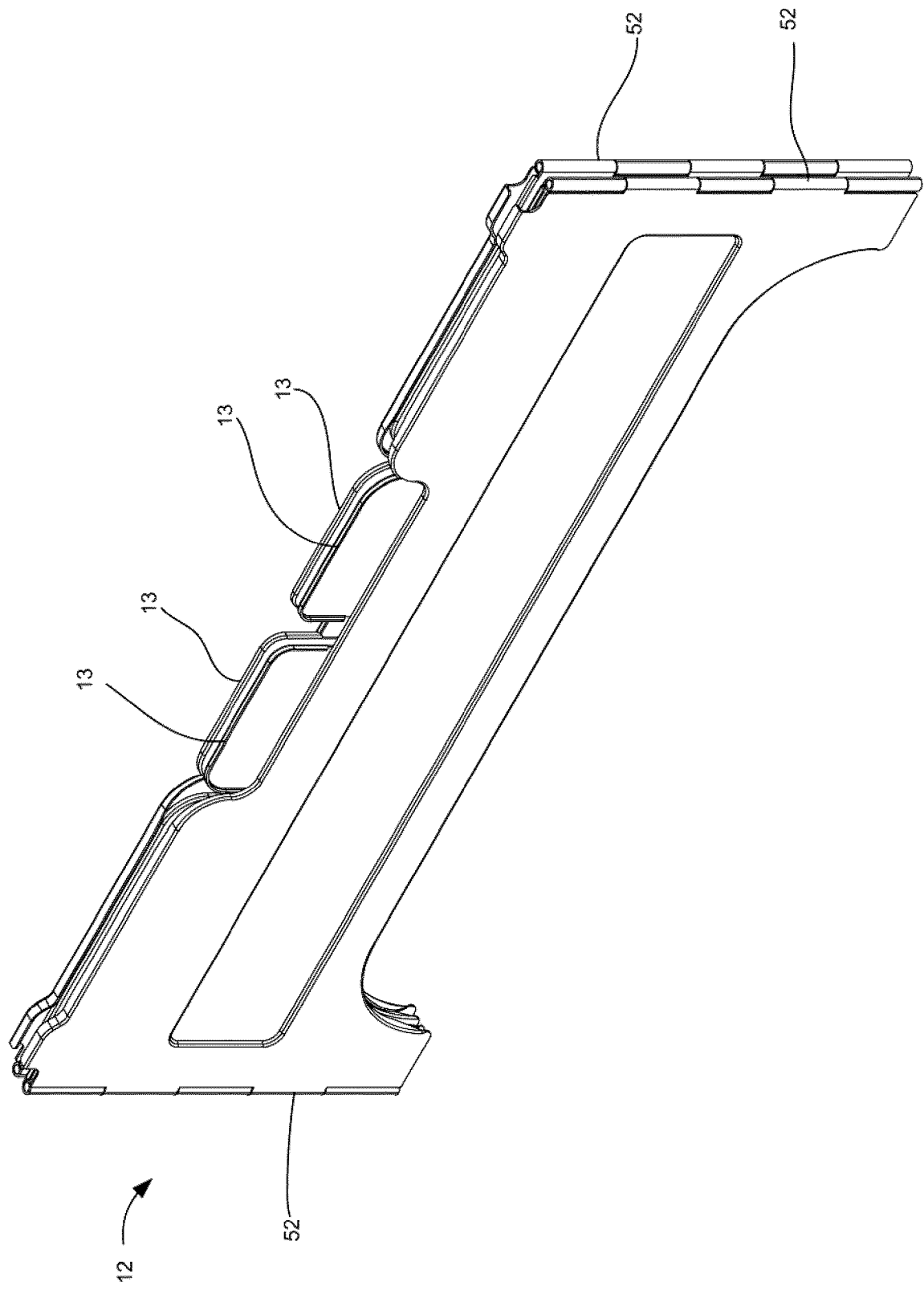
FIGS. 35 to 38 are perspective, top, side, and front views, respectively of the frame of FIG. 1, in a collapsed position.
Figure 37:
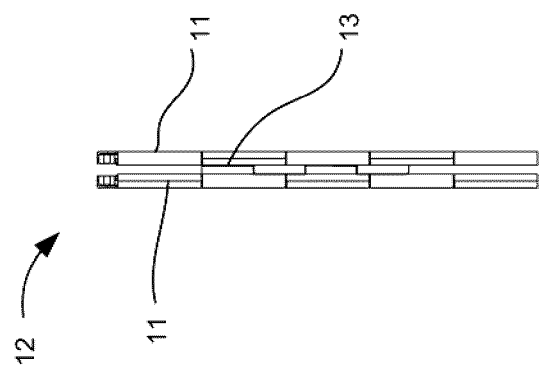
Figure 36:
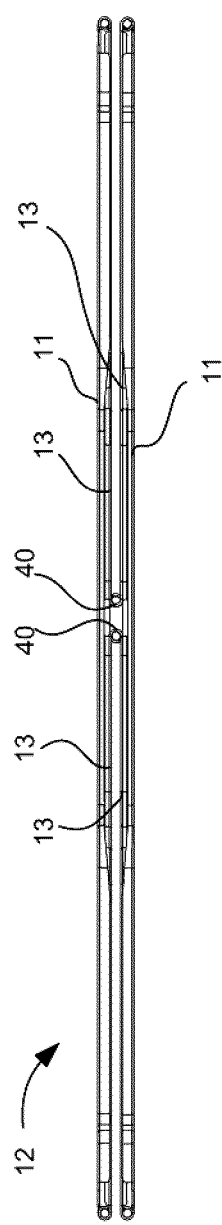
Figure 38:
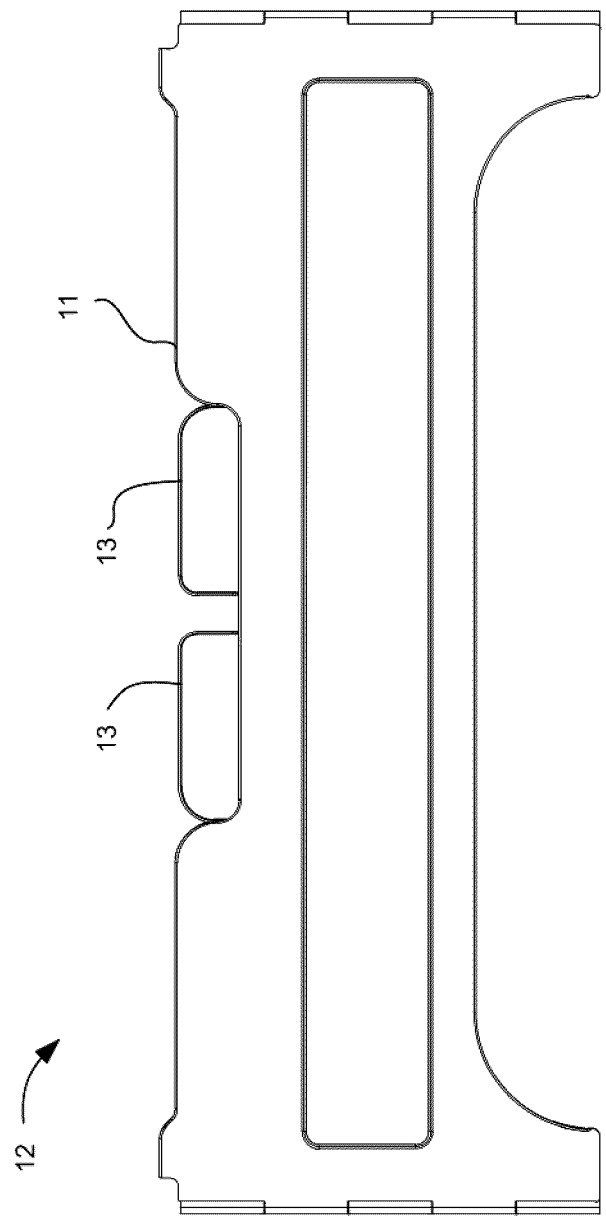
Figure 39:
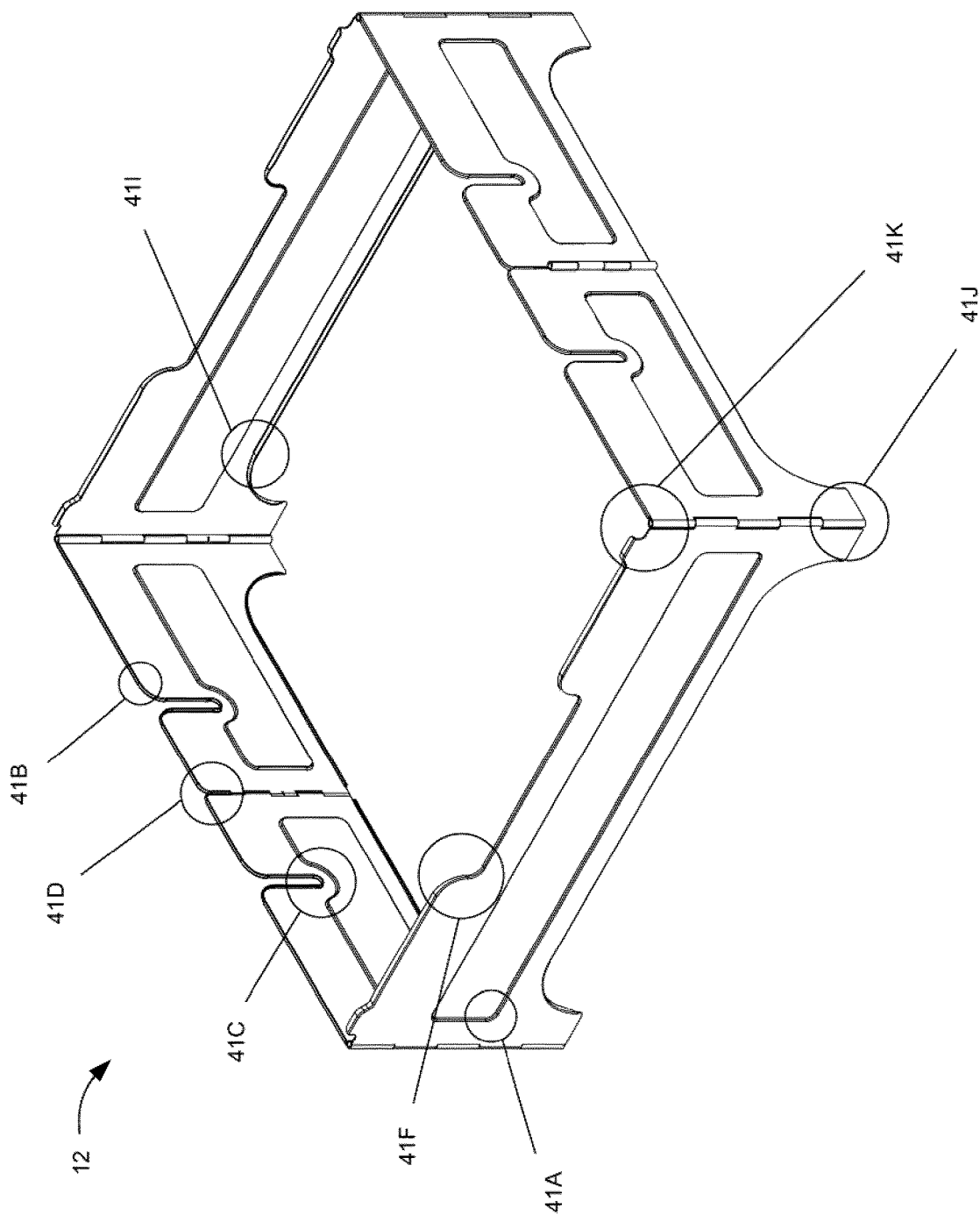
FIG. 39 shows regions of the frame of FIG. 31.

Shown at FIGS. 7G-7I, the frame 12 includes side hinges 40 and corner hinges 52. The hinges 40, 52 allow for the frame 12 to fold (see folded frame 12 at FIGS. 35-37). The frame 12 includes side hinges 40 with a folded internal edge 42, this acts as a stop for the side hinge 40 at 180° to allow for easier assembly and an increased structural strength.

Shown at FIG. 7I, the frame 12 include lugs 44 at a top surface 46 of the frame 12. The lugs 44 are for mounting a portable grill 102 (FIGS. 12-15, 42-45B) to the frame 12. The lugs 44 and top surface 46 may also support cookware (such as frying pots and pans) above the base 10.

FIG. 7J displays the position of the insert 14 when assembled. The insert 14 has an angled structure 48 that creates a better airflow for cleaner, more efficient combustion. The frame 12 include sides 50 for shielding the combustible contents against strong wind. The angled insert 48 provides structural strength and ensures that ash falls into the lowest parts of the insert 14, allowing for an easier clean-up.

The insert's 14 corner hinge 52 knuckles are shorter to prevent buckling and damage during use, adding to the durability of the assembly.

Figure 29:
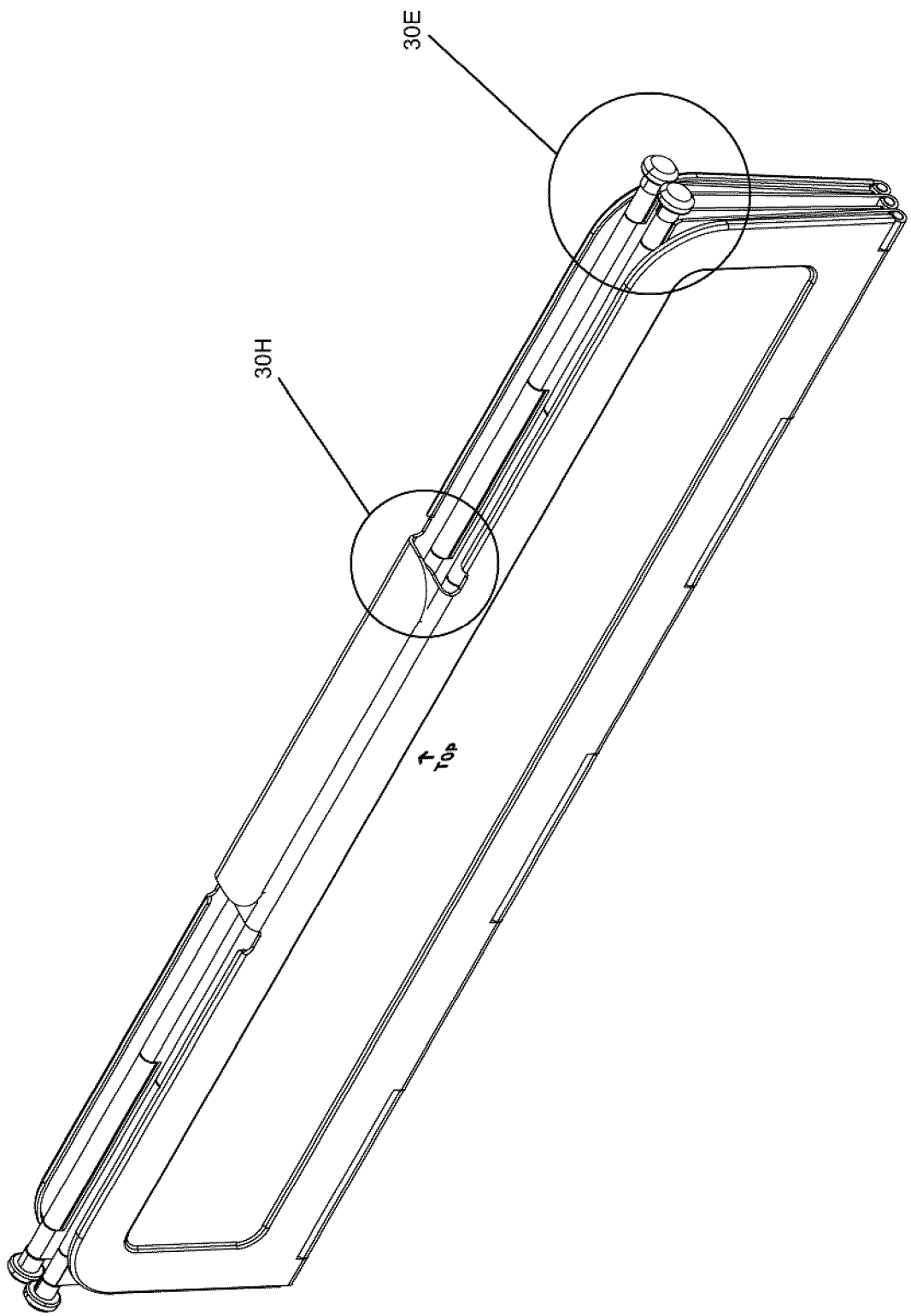
FIG. 29 shows regions of the insert of FIG. 24.
Figure 31:
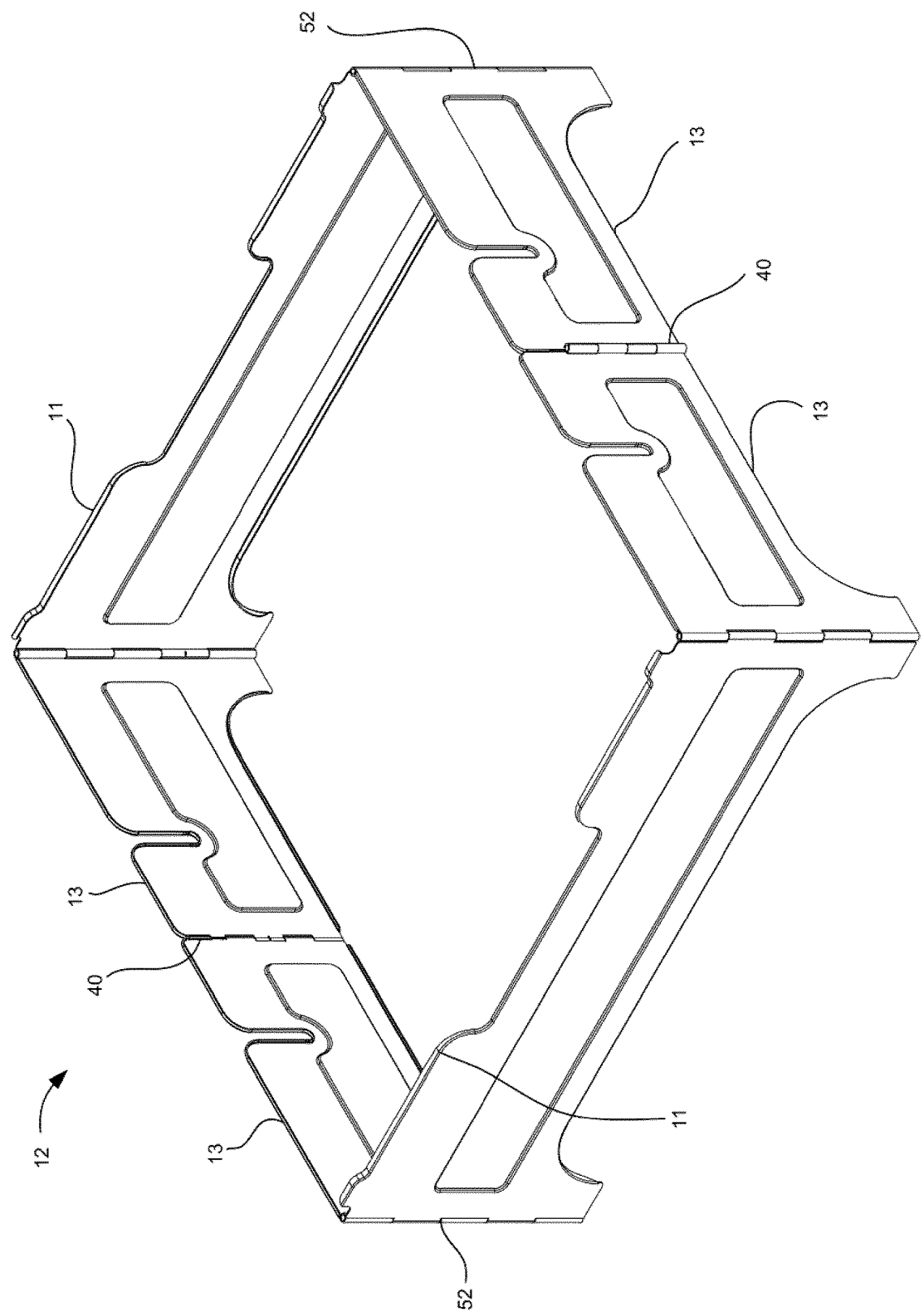
FIGS. 31 to 34 are perspective, top, front, and side views, respectively, of the frame of FIG. 1, in an assembled position.
Figure 32:
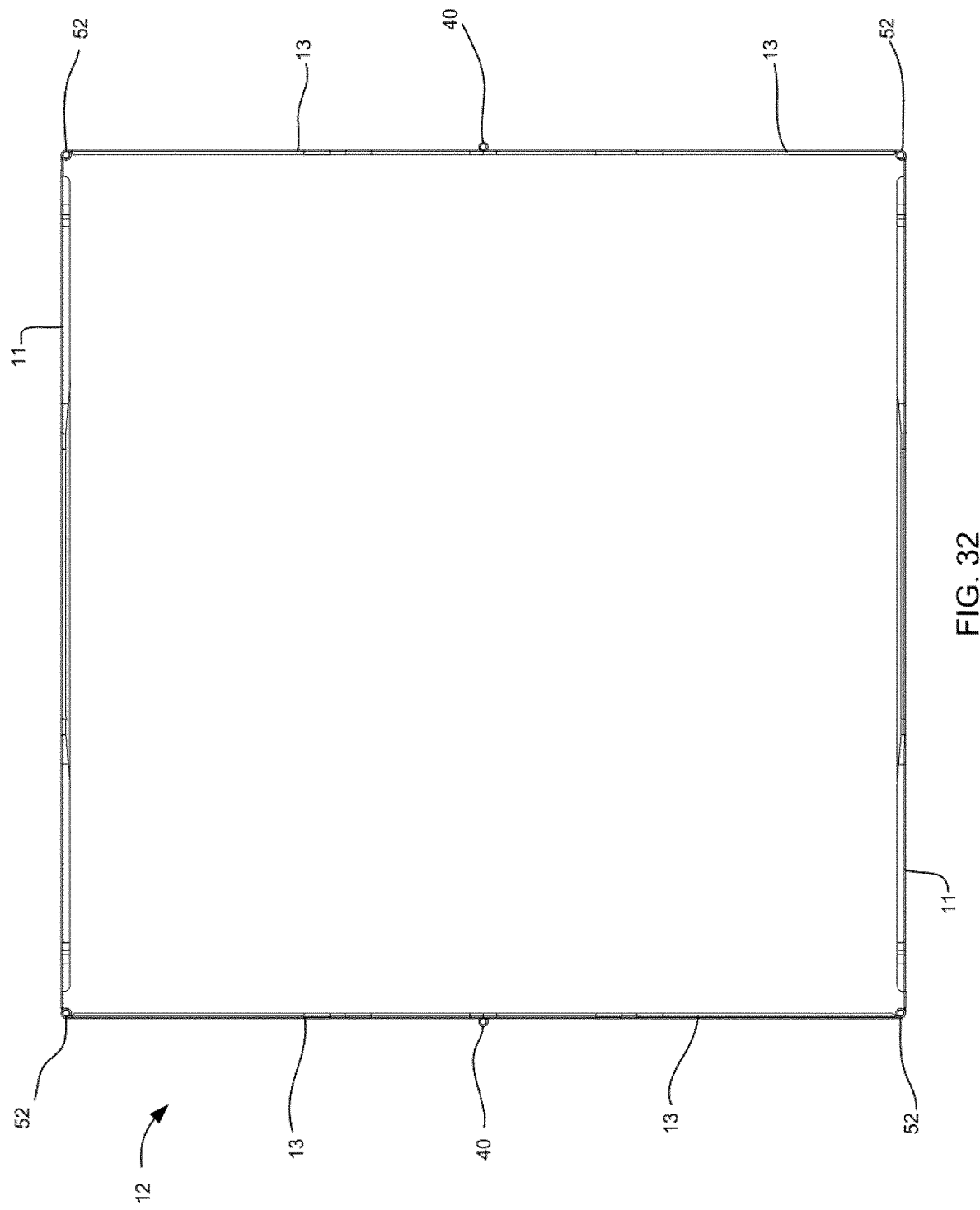
Figure 33:
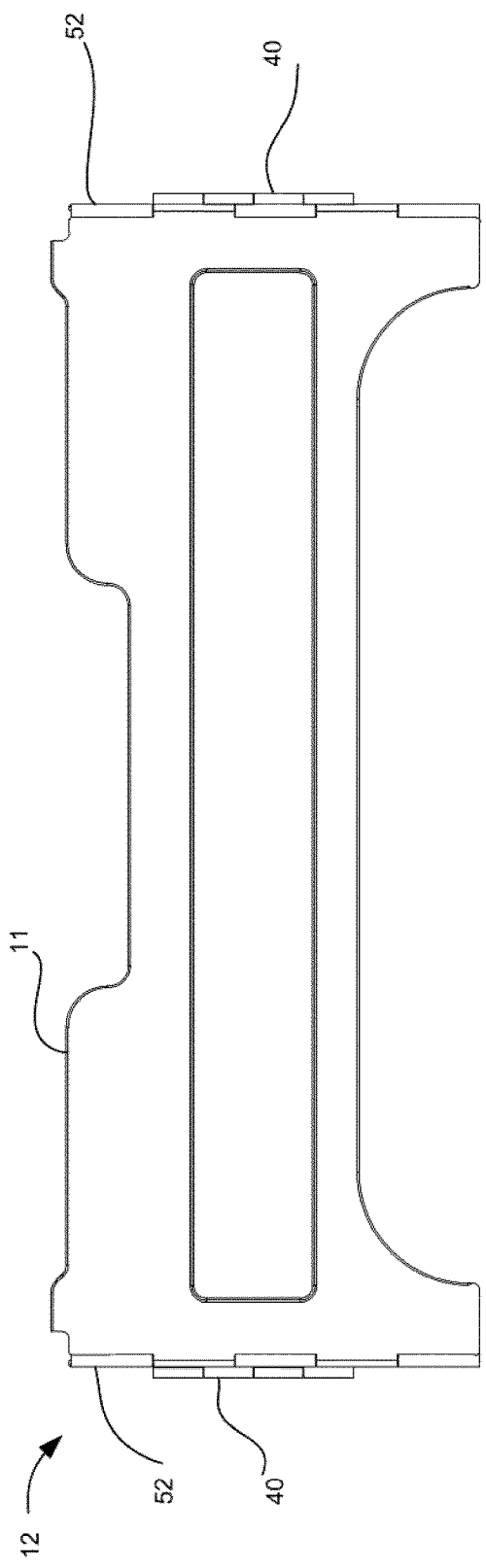
Figure 34:
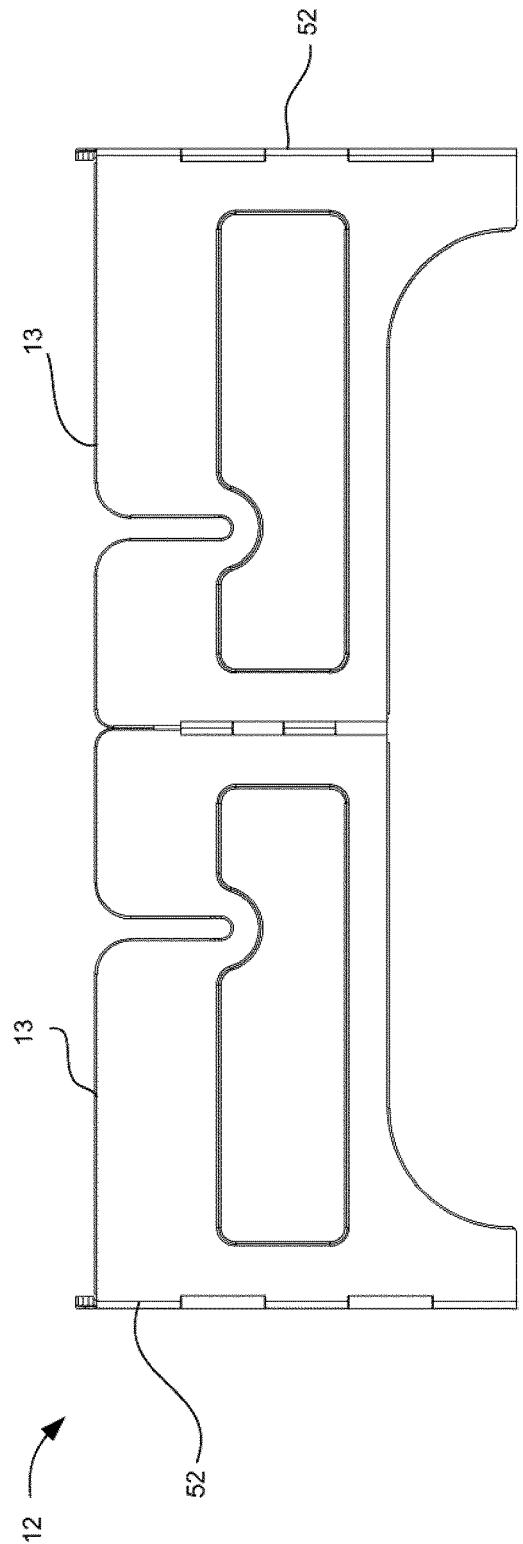

Turning now to FIGS. 28 to 30H, illustrated therein is the insert 14, in an expanded view (FIG. 28) and a compact view (FIG. 29).

Shown in FIGS. 30A and 30B, the insert 14 includes a folded edge 54 and recesses 17. The folded edge 54 and recesses 17 may strengthen the sheet materials used and prevent buckling from heat during use. The folded edge 54 and recesses 17 may not cause interference when the insert 14 is closed and compact.

FIGS. 30C, 30D and 30E show the pin 16. The pin 16, (and the handle 24 in FIGS. 20-24) is one of the ways that the insert 14 is mounted to the frame 12. The pins 16 are detailed to both nest compactly within the insert 14 when closed, but be large enough to structurally mount the insert 14 to the frame 12. The insert 14 corners have a lipped detail 56 that has filleted (rounded) edge for providing that the pins 16 align smoothly to the frame 12, and for latching on to prevent the part slipping through the slot mount 18.

FIG. 30F displays the fold hinge 19 knuckles. The fold hinges 19 are at a reduced length from the pin hinge 20 knuckles in order to prevent buckling and damage during use, from a shorter naked edge on the cutout side of the hinge. Fold hinges 19 may increase strength and durability without compromising weight.

Shown in FIG. 30G, the insert 14 includes a handle cutout 58 surrounding the handle 24. The handle cutout 58 allows for (1) the folded edge strengthening detail 54 to surround a greater area, and (2) the handle cutout 58 aligns to the folded edge on the frame 12, ensuring a better, more secure mounting of the insert 14 with the frame 12.

Shown in FIG. 30H, the insert 14 includes handles 24a, 24b in closed and in compact position. The two handles 24a, 24b act to lock the insert 14 together when closed. One handle 24a being higher than the handle 24b combined with calculated angles creates a snap of the two outermost insert panels 21 keeping the insert 14 closed when folded. The angle and design also aids in the mounting to the frame 12 and prevents the insert 14 being easily knocked off the frame during operation.

Turning now to FIGS. 31-38, the frame 12 includes two end bodies 11 and four side bodies 13. The end bodies 11 are pivotably connected to the side bodies 13 by corner hinges 52. The side bodies 13 are pivotably connected to one end body 11 by corner hinges 52. The side bodies 13 are also pivotably connected to one other side body 13 by side hinge 40.

Figure 40:
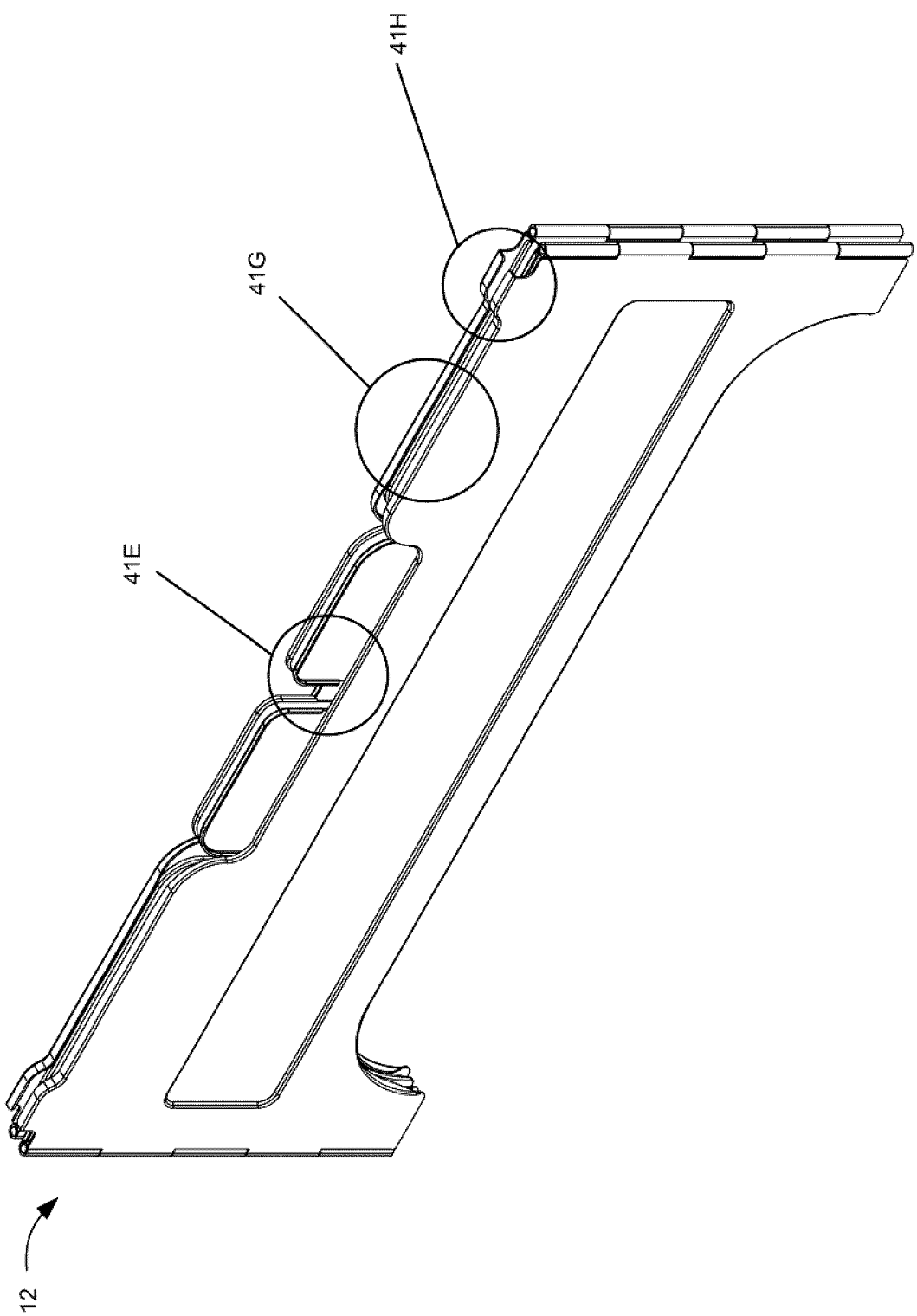
FIG. 40 shows regions of the frame of FIG. 35.

Turning now to FIGS. 39 to 41K, illustrated therein is the frame 12, in an expanded position (FIG. 39) and a compact position (FIG. 40). In the compact position (FIG. 40), the side bodies 13 fold inward at the side hinge 40 such that the side bodies 13 become nestled between the end bodies 11.

As shown in FIGS. 41A, 41B and 41C, the frame 12 includes a folded edge 60 and recesses 22, 30. The folded edge 60 and recesses 22, 30 strengthen the sheet materials used and prevent buckling from heat during use. They are designed such that they do not cause interference when the frame 12 is in the compact position.

FIGS. 41D and 41E show the hinge stop 40 design on the side bodies 13. The hinge stop 40 prevents rotation greater than 180° ensuring that assembly of the insert 14 into the frame 12 is easy and ergonomic. FIG. 41E shows the hinge stop 40 in the closed and compact mode nesting into the handle cutout 26 to ensure there is no interference and keep the pack-down size slim.

FIGS. 41F, 41G, 41H and 41I, display the various folded edge details, including the folded edge on the lugs 44 for mounting grill surfaces to the frame 12. These details are all designed to increase strength, but also to nest to one another when the frame 12 is closed, this includes longer raised edges as well as variable dimension folded edges (FIG. 41F).

FIG. 41J shows the frame feet 34. The frame feet 34 are designed to be structurally strong from a reduced surface area, in order to prevent possible heat damage to the ground surface.

FIG. 41K displays the lug 44 for mounting cooking surfaces (i.e. cooking surface 103 in FIGS. 8 and 42-44) and for supporting large pots and pans for cooking. The square edges may be rounded to remove sharp edges.

Turning now to FIGS. 8 to 11, illustrated therein is a grill assembly 100, in accordance with an embodiment. The grill assembly 100 includes the base 10 described with reference to FIGS. 1 to 7. The grill assembly 100 includes a portable grill 102. The grill 102 includes a portable cooking surface 103 for supporting cookware or items to be cooked directly on the grill surface 103. The grill 102 includes a collapsible stand 104 that includes scissor arms that folds to collapse the grill 102. The grill 102 is positioned over the base 10. The grill 102 may provide for an increased fuel burning area. The grill 102 may be, for example, as illustrated in U.S. Design Pat. No. D488,359 Issued Apr. 2, 2019.

The collapsible grill 102 is positioned over the grill base assembly 10. The collapsible grill 102 may provide for an increased fuel burning area.

Figure 42:
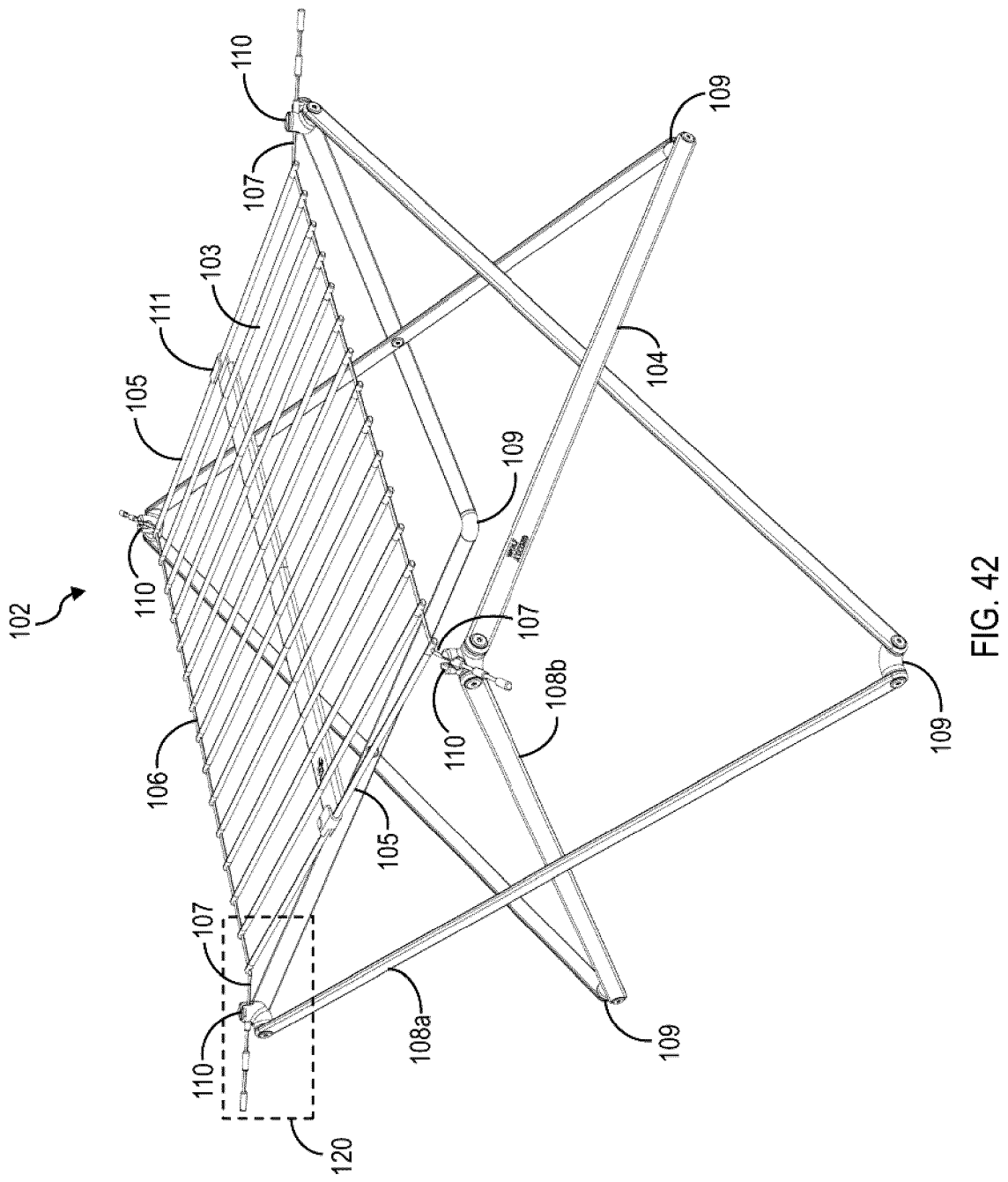
FIG. 42 is a perspective view of a portable grill, in accordance with an embodiment.

Referring to FIG. 42, illustrated therein is the portable grill 102, according to an embodiment. The grill 102 includes only two parts: a cooking surface 103 and a collapsible stand 104. This is advantageous compared to existing portable grills that have numerous parts that must be assembled/disassembled and may become lost. Furthermore, the attachment of the cooking surface 103 to the stand 104 does not require any tools and may be done easily by hand. The portable grill 102 may be used in a standalone fashion or used in combination with the pire fit 10 (FIGS. 8-11).

The cooking surface 103 includes a plurality of parallel metal rods 105 spaced at increments. Adjacent metal rods 105 are attached at the ends by flexible metal wire 106. This arrangement allows for the cooking surface 103 to transition between a planar configuration, used for cooking, and a rolled configuration for transport/storage.

In the planar configuration, the metal wires 106 are straight and lie in plane with the metal rods 105 forming a substantially planar surface for supporting food or cookware (FIGS. 42-44C). In the rolled configuration, the metal wires 106 are bent allowing for the metal rods 106 to be rolled up into a bundle for transport/storage (FIG. 45B).

The cooking surface 103 includes four corner projections 107 for removably attaching the cooking surface 103 to the stand 104. The corner projections 107 may be constructed of the same metal wire as metal wires 106. The rods 105, wires 106 and projections 107 are preferably constructed of 304 stainless steel.

The cooking surface 103 may be used with the stand 104 (as shown) or may be used with the base 10 (FIGS. 12-15). According to an embodiment, the cooking surface 103 may be used in a standalone fashion when propped up by objects, for example, rocks.

Still referring to FIG. 42, the stand 104 includes four pair of scissor arms (representative pair of arms 108*a*, 108*b* are shown) arranged in a square. Each pair of arms 108*a*, 108*b* is pivotable at its crossing point allowing for the stand 104 to be collapsible and varied in height. Each pair of arms 108*a*, 108*b* includes two top ends above the crossing point and two bottom ends below the crossing point.

The stand 104 includes four bottom corner joints 109. The bottom corner joints 109 connect the bottom ends of adjacent pairs of crossed arms 108*a*, 108*b* and form the feet of the stand when the stand 104 is in use. The stand 104 includes four top corner joints 110. The top corner joints 110 connect the top ends of adjacent pairs of crossed arms 108*a*, 108*b*.

The portable grill 102, may optionally include a brace 111, for holding apart the outermost metal rods 105, thereby straightening the metal wires 106 and bracing the cooking surface 103 in the planar configuration.

Figure 43:
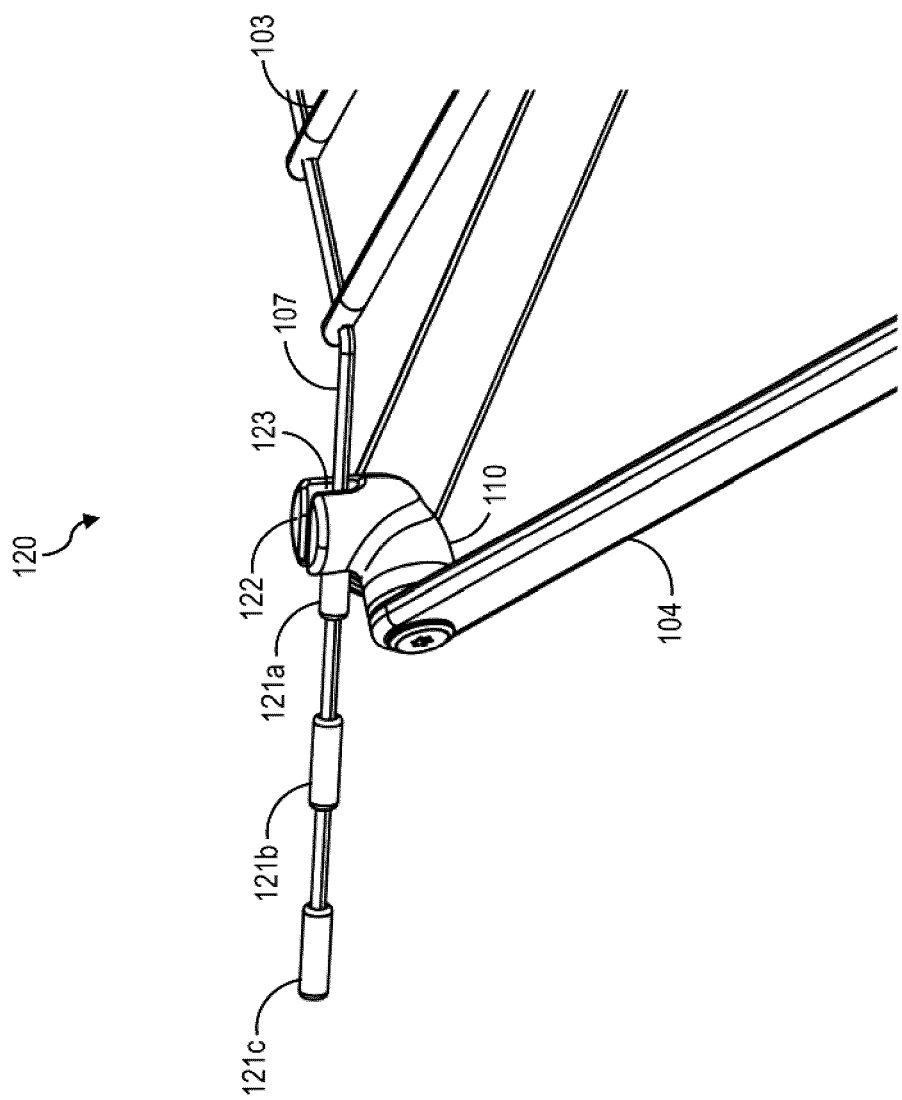
FIG. 43 is a detailed view of a top corner joint of FIG. 42.

Referring to FIG. 43, illustrated therein, is a detailed view of region 120 in FIG. 42 showing the attachment of the corner projection 107 to the top corner joint 110. The top corner joint 110 includes a corner groove 123 in a top surface 122. The corner projection 107 includes a plurality of metal stoppers 121*a*, 121*b*, 121*c*, disposed on the projection 107. The plurality of stoppers 121*a*, 121*b*, 121*c*, are disposed on the projection 107 at increments corresponding to fixable heights of the stand 104.

To attach the cooking surface 103 to the stand 104, the corner projections 107 are inserted into the groove 123 such that one of the stoppers 121*a*, 121*b*, 121*c* (as shown, 121*b*), is retained by the groove 123. To setup the cooking surface 103 in the planar configuration, and fix the height of the stand 104, the same stopper 121*a*, 121*b*, 121*c* on each projection 107 is retained by the groove 123 in each top corner joint 110. The height of the stand 104 may be adjusted by selecting which of the stoppers 121*a*, 121*b* or 121*c* is retained by the groove 123.

Figure 44A:
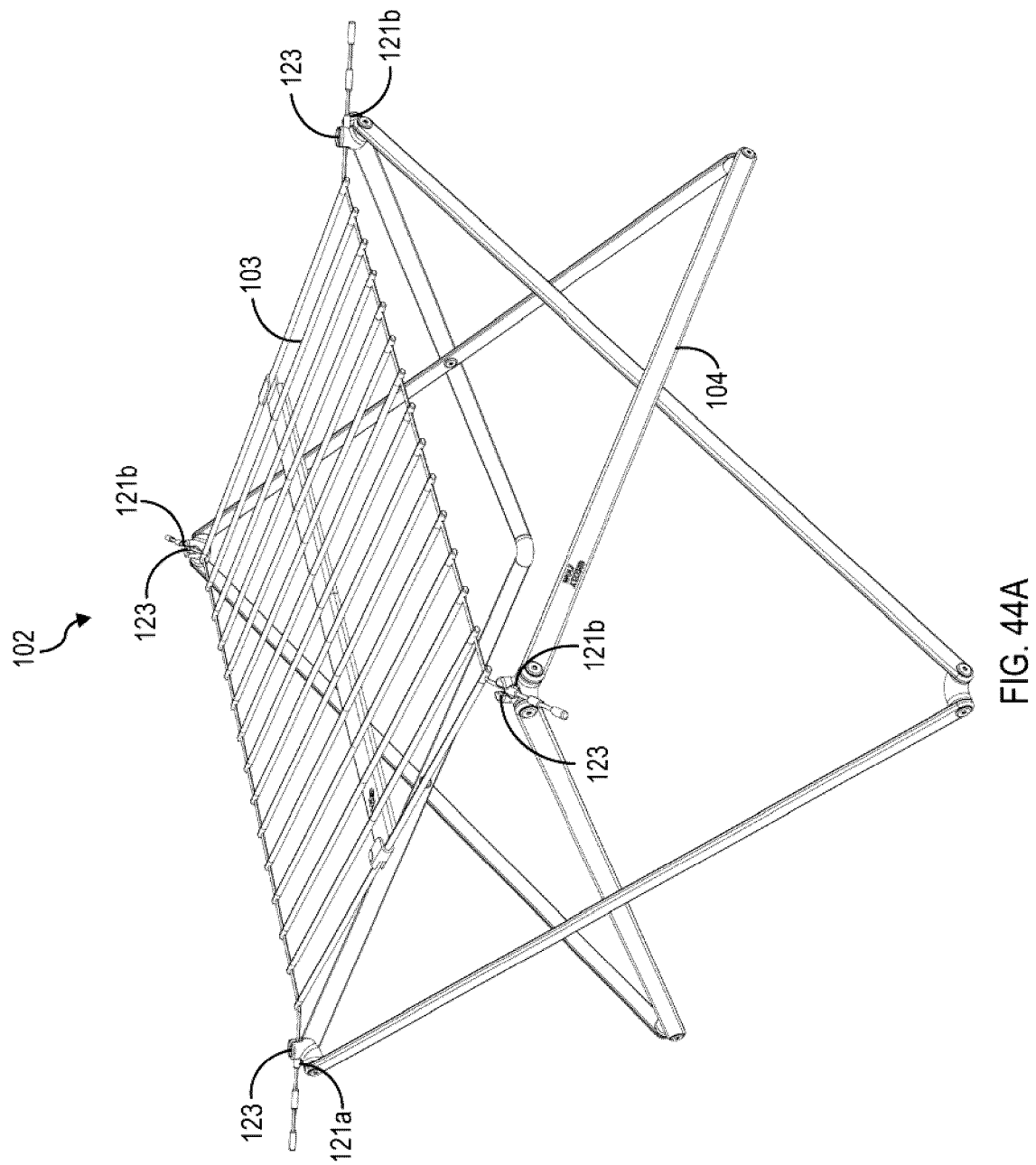
FIGS. 44A to 44C are perspective views showing height adjustment of the grill of FIG. 42.
Figure 44B:
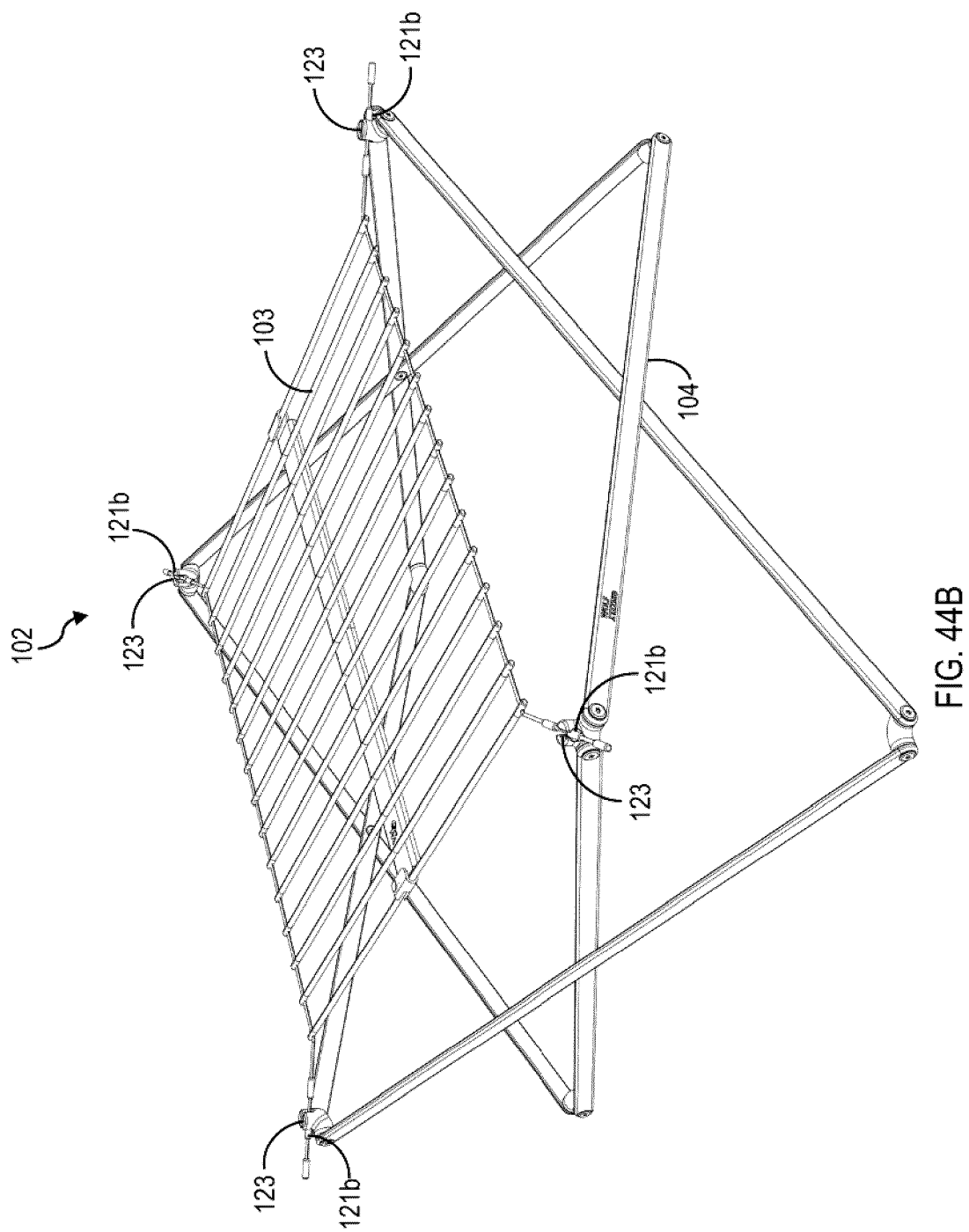
Figure 44C:
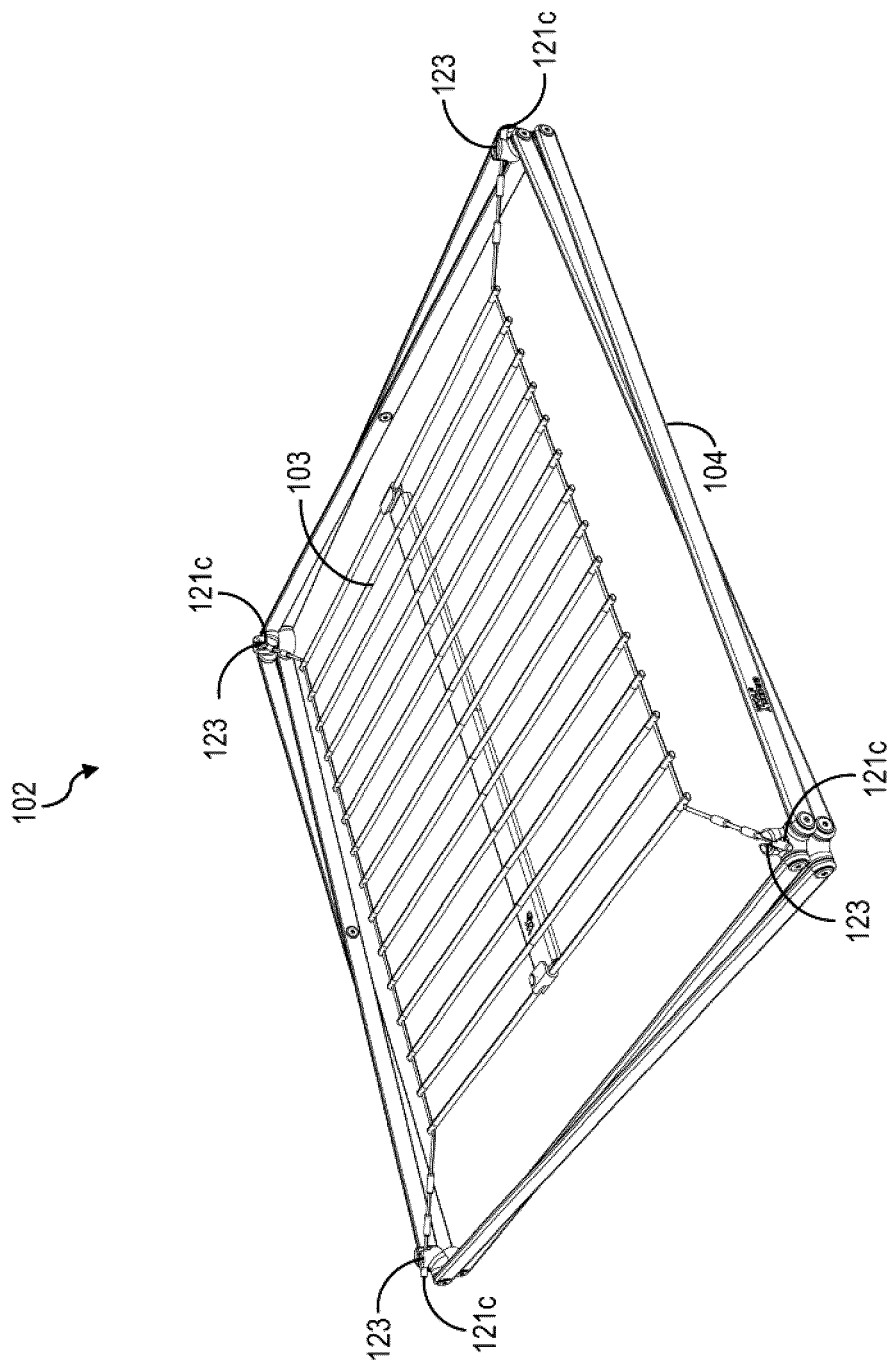

Now referring to FIGS. 44A to 44C, illustrated therein are perspective views showing height adjustment of the grill 102. FIG. 44A shows the grill 102 at a high height. The high height may be used, for example, cooking over a wood fire or high burning flame. To fix the stand 104 at the high height, the stoppers 121*a* (i.e. the stoppers closest to the cooking surface 103) are inserted into the grooves 123. Retaining of the stoppers 121*a* by the grooves 123 fixes the cooking surface 103 in the planar configuration and fixes the stand 104 at the high height.

FIG. 44B shows the grill 102 at a medium height. The medium height may be used, for example, cooking over a charcoal or a low burning flame. To fix the stand 104 at the medium height, the stoppers 121*b* (i.e. the stoppers at an intermediate distance from the cooking surface 103) are inserted into the grooves 123). Retaining of the stoppers 121*b* by the grooves 123 fixes the cooking surface 103 in the planar configuration and fixes the stand 104 at the medium height.

FIG. 44C shows the grill 102 at a low height. To fix the stand 104 at the low height, the stoppers 121*c* (i.e. the stoppers furthest from the cooking surface 103) are inserted into the grooves 123). Retaining of the stoppers 121*c* by the grooves 123 fixes the cooking surface 103 in the planar configuration and fixes the stand 104 at the low height.

The low height may be used to prop up the grill 102 such that the cooking surface 103 may be used at any height above a flame depending on the props used. For example, rocks may be placed under the stand 104 to prop up the grill 102 and vary the height of the cooking surface 103 above the flame. The use of larger rocks would raise the cooking surface 103 to a higher height compared to the use of smaller rocks. Further, the low height may be used to deploy the grill 102 on uneven ground by using props of various sizes keep the cooking surface 103 level.

Figure 45A:
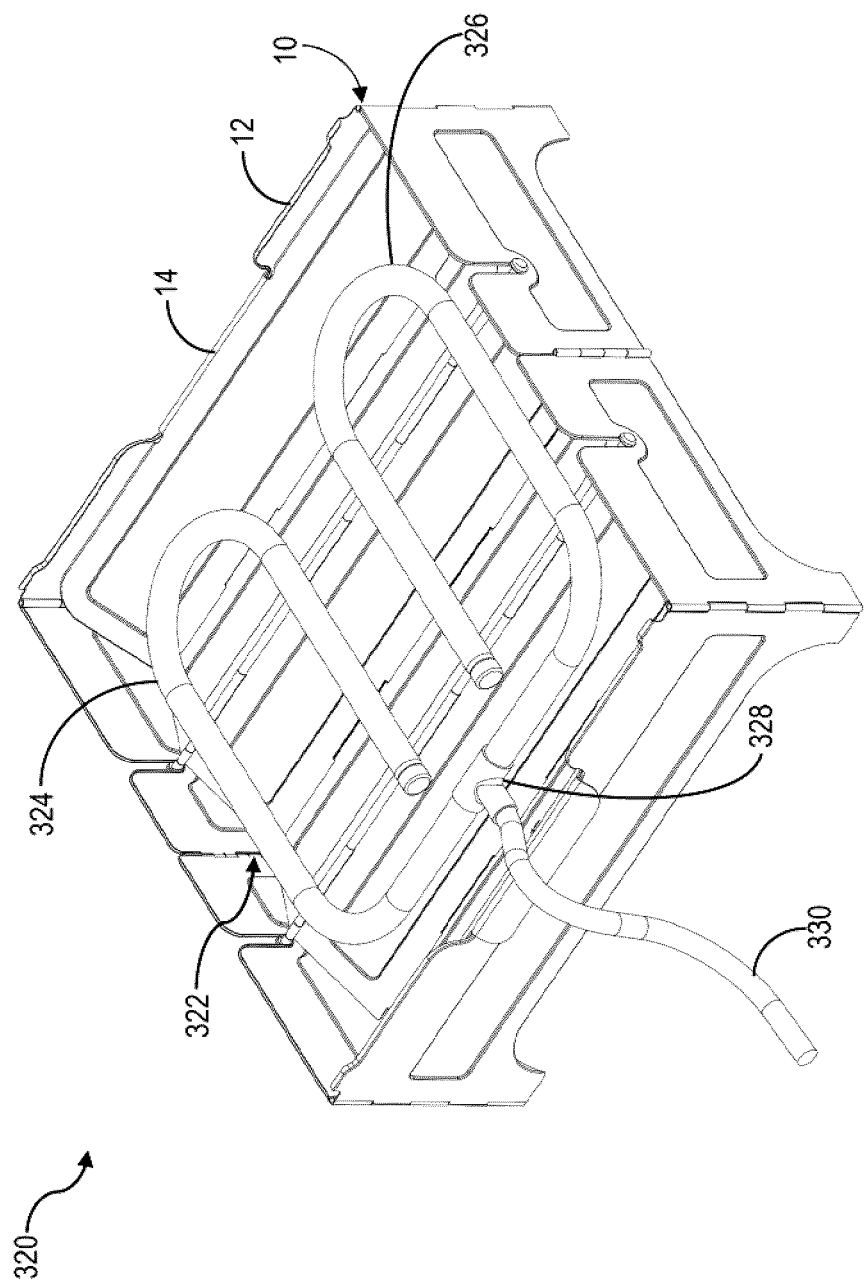
FIGS. 45A to 45B show perspective and top view, respectively of a grill assembly, in accordance with an embodiment.
Figure 45B:
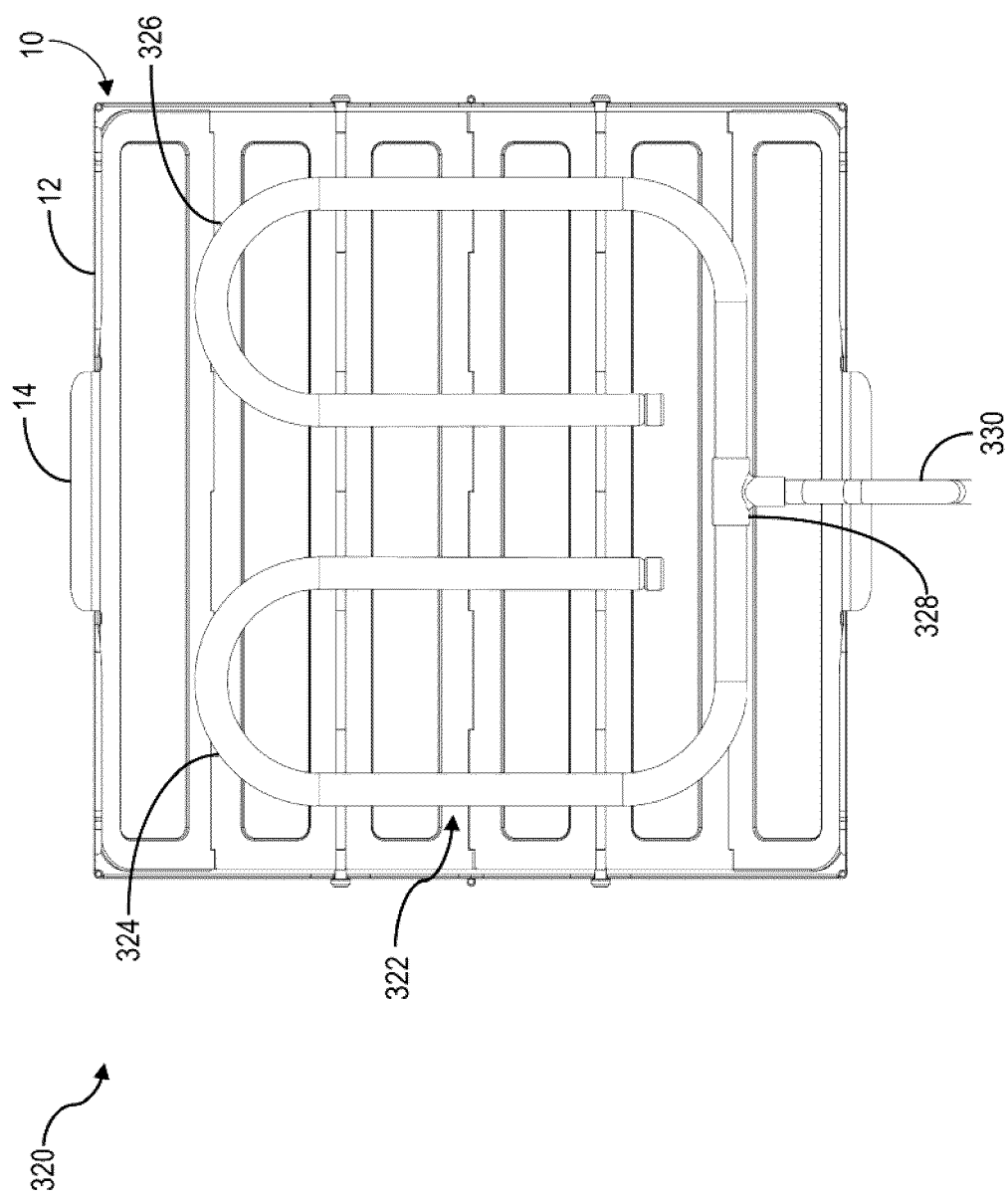

Referring to FIG. 45A, illustrated therein is the stand 104 shown in a collapsed position for transport/storage. The stand 104 is collapsed by detaching the stand 104 from the cooking surface (i.e. cooking surface 103 in FIGS. 42-44) and pulling the top corner joints 110 and the bottom corner joints 109 apart such until the top corner joints 110 are adjacent and the bottom corner joints 109 are adjacent.

Referring to FIG. 45B, illustrated therein is the cooking surface 103 shown in the rolled configuration for transport/storage. In the rolled configuration, the cooking surface 103 may be wrapped around the collapsed stand (FIG. 45A) to make for compact storage and transport.

Turning now to FIGS. 12 to 15, illustrated therein is a grill assembly 200, in accordance with an embodiment. The grill assembly 200 includes the base 10 described with reference to FIGS. 1 to 7. The grill assembly 200 includes the cooking surface 103 that spans the frame 12 and insert 14. The cooking surface 103 is attached to the frame 12 by the lugs 44. The cooking surface 103 is supported by the top surface 46 of the frame 12.

Turning now to FIGS. 16 to 19, illustrated therein is a grill assembly 300, in accordance with an embodiment. The grill assembly 300 includes the base 10, frame 12 and insert 14 described with reference to FIGS. 1 to 7. The grill assembly 300 includes a fuel burner 302 for providing heating to the assembly 300. The fuel burner 302 may provide gas, propane, electric, or kerosene heat. The fuel burner 302 is positioned atop the insert 14 and below the top surface of the frame 12. A portable grill or cooking surface may be positioned above the top surface of the frame 12.

Figure 46A:
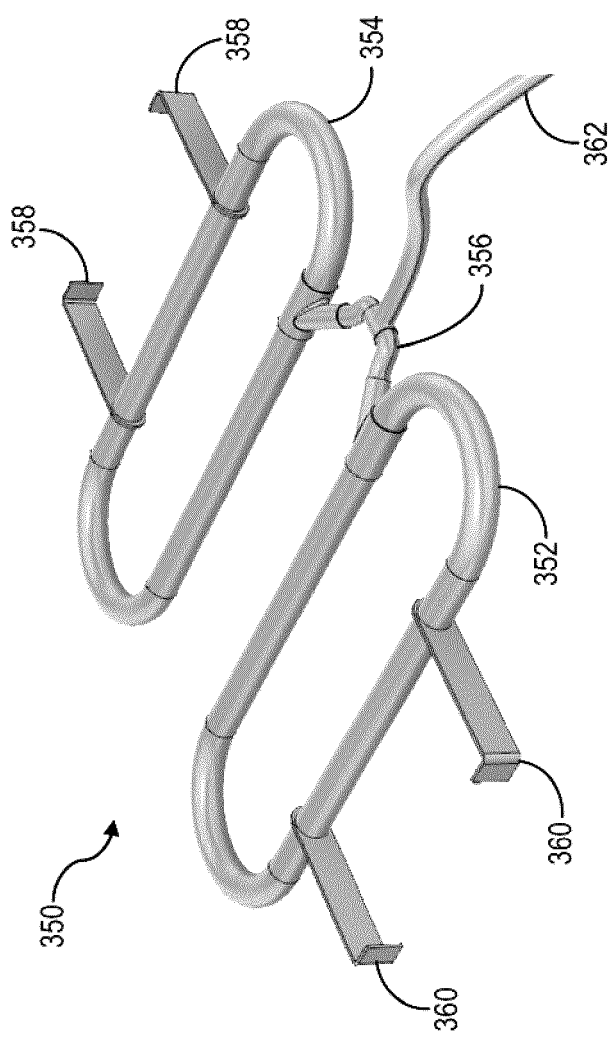
FIGS. 46A to 46B are perspective views of a portable fuel burner, in accordance with an embodiment.
Figure 46B:
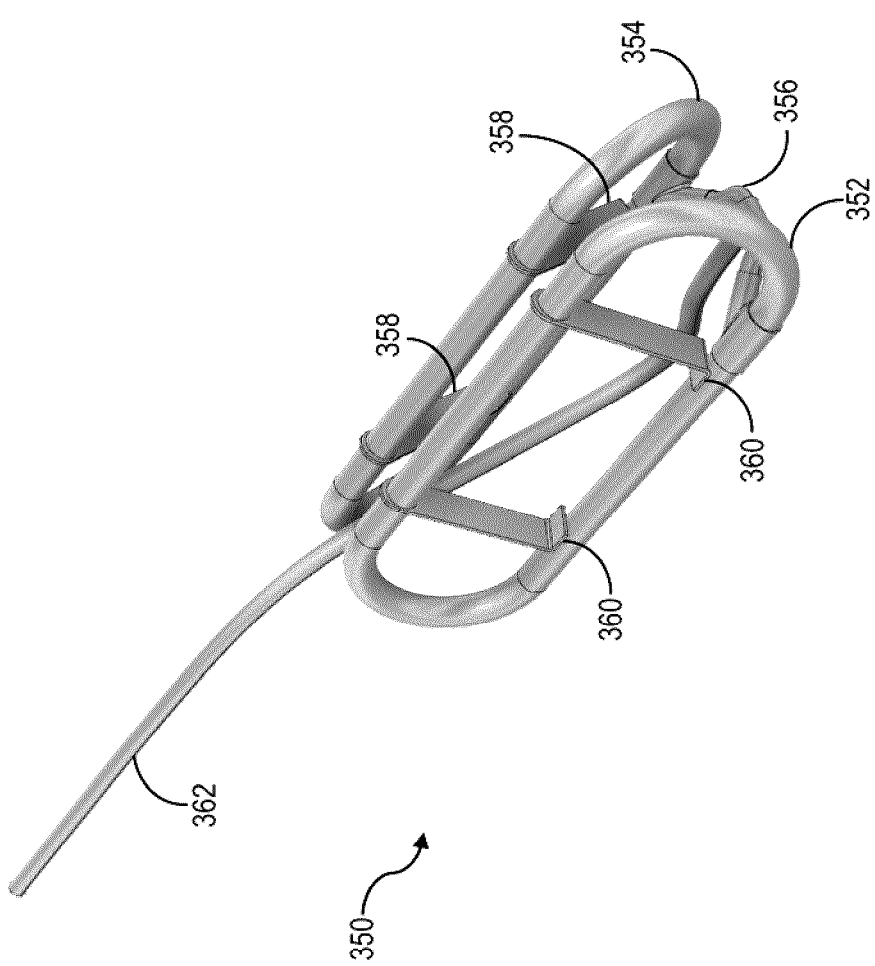

The fuel burner 302 includes heating elements 304, 306 for generating heat or flame. Each heating element 304, 306 includes two support arms 310, 312. The support arms 310, 312 are rotatable about the point of connection with the heating elements 304, 306. The heating elements 304, 306 are pivotably connected by a center joint 314. According to an embodiment the fuel burner 302 may be collapsible (FIGS. 46A-46B).

The fuel burner 302 includes a hose 308 for connecting the heating elements 304, 306 to a fuel source (not shown). According to an embodiment, the hose 308 is an electrical cord for connecting to a power source.

In FIGS. 16 to 19, the fuel burner 302 in shown removably attached to the frame 12. The insert 14 must be attached to the frame 12, prior to attaching the fuel burner 302. To attach the fuel burner 302 to the frame 12, the support arms 310, 312 are inserted into the slot mounts 18 of the frame 12 so that the heat elements 304, 306 rest on top of the insert 14.

Referring to FIGS. 45A and 45B, illustrated therein are perspective (FIG. 45A) and top (FIG. 45B) views of a grill assembly 320, according to an embodiment. The grill assembly 320 includes the base 10, frame 12 and insert 14 described with reference to FIGS. 1 to 7. The grill assembly 320 includes a fuel burner 322. The fuel burner 322 includes heating elements 324, 326 connected by a center joint 328. The heating elements 324, 326 rest on the insert 14 within the frame 12. The fuel burner 322 includes a hose 330 for a hose 330 for connecting the heating elements 324, 326 to a fuel source (not shown).

Referring to FIGS. 46A and 46B, illustrated therein is a fuel burner 350, according to an embodiment. The fuel burner 350 may be substituted for the fuel burner 300 in FIGS. 16-19 or the fuel burner 320 in FIGS. 45A and 45B. The fuel burner 350 is convertible between an open configuration (FIG. 46A) for use, and a closed configuration (FIG. 46B) for transport/storage. In the open configuration (FIG. 46A), the heating elements 352, 354 are folded outward at the center joint 356 to be substantially planar. The support arms 358, 360 are rotated outward for engaging the slot mounts in the frame (not shown).

In the folded configuration (FIG. 46B), the heating elements 352, 354 are folded inward at the center joint 356, and the support arms 358, 360 are rotated inward to nestle within the circumference of the heating elements 352, 354 and the hose 362 is folded, thereby reducing the footprint of the fuel burner 350 for compact storage/transport.

While the above description provides examples of one or more apparatus, methods, or systems, it will be appreciated that other apparatus, methods, or systems may be within the scope of the claims as interpreted by one of skill in the art.

The invention claimed is:

1. A portable base, comprising:
a collapsible frame for containing combustion, the frame comprising:
opposable front and back walls;
opposable side walls attached to the front and back walls by corner hinges;
wherein each side wall includes a side hinge; and
a collapsible insert for holding combustible material, the insert comprising:
a plurality of insert panels connected by a plurality of hinges; and
at least one tip for attaching the collapsible insert to the collapsible frame.

2. The portable base of claim 1, wherein at least one of the walls includes a slot mount for receiving the tip of the collapsible insert.

3. The portable base of claim 2, wherein the tip protrudes from at least one of the plurality of hinges for fitting into the slot mount in at least one of the walls of the collapsible frame.

4. A portable grill assembly comprising the base of claim 3, and a fuel burner, the fuel burner comprising:
at least one heating element; and
a hose for connecting the at least one heating element to a fuel source.

5. The grill assembly of claim 4, wherein the at least one heating element comprises:
two heating elements, wherein each heating element includes two rotatable support arms for inserting into the slot mounts; and
a center joint positioned between the heating elements for connecting the heating elements to the hose.

6. The grill assembly of claim 5, wherein the two heating elements are pivotably connected to the center joint, whereby the fuel burner is collapsible by folding the heating elements inward at the center joint.

7. The portable base of claim 1, wherein the collapsible insert includes handles on the outermost insert panels for grasping the insert, and wherein the handles engage notches in the side walls.

8. The portable base of claim 7, wherein the fitting of the tip into the slot mount, and the handles engaging the notches in the side walls removably attaches the insert to the frame.

9. The base of claim 1, wherein the side walls to fold inward at the side hinges to lie flat between the front and back walls when the frame is in a collapsed position.

10. The base of claim 1, wherein the plurality of hinges fold alternatively in a accordion fashion.

11. The base of claim 10, wherein the plurality of insert panels fold to lie flat against each other when the insert is in a collapsed position.

12. The base of claim 10, wherein the plurality of insert panels fold to form troughs between adjacent insert panels when the insert is attached to the frame, thereby allowing air to circulate to promote combustion, and collect ash in the troughs.

13. The base of claim 1, wherein the frame further comprises cutouts in the front, back and side walls for air circulation to cool the frame and reduce or eliminate heat damage to the ground below the base.

14. The base of claim 1 further comprising:
a plurality of lugs on a top of the frame for supporting cookware or a cooking surface; and
a portable cooking surface attached to the lugs on the top of the frame.

15. The base of claim 1, wherein the frame and the insert further comprise reinforcing folded edges to prevent deformation from heat.

16. A portable grill assembly, comprising:
a portable grill comprising:
a cooking surface being convertible between a planar configuration and a rolled configuration; and
a collapsible stand for supporting the cooking surface,
a portable base, comprising:
a collapsible frame for containing combustion, the frame comprising:
opposable front and back walls; and
opposable side walls attached to the front and back walls by corner hinges;
wherein each side wall includes a side hinge;
a collapsible insert for holding heating combustible material, the insert comprising:
a plurality of insert panels connected by a plurality of hinges; and
at least one tip for attaching the collapsible insert to the collapsible frame; and
wherein the stand is positioned around the base such that the cooking surface is positioned above base and centered over the insert.

17. A portable grill assembly of claim 16, wherein the collapsible stand comprises:
four pairs of scissor arms arranged in a square, wherein each pair of arms is pivotable at its crossing point and includes two top ends and two bottom ends;
four bottom corner joints for joining the bottom ends of adjacent pairs of crossed arms, wherein the bottom corner joints form feet of the stand when in use; and
four top corner joints for joining the top corner joints of adjacent pairs of crossed arms, wherein a top surface of each top corner joint includes a corner groove;
wherein the cooking surface is removably attached to the stand by inserting corner projections of the cooking surface into four corner grooves such that the projections are retained by the grooves, thereby fixing the cooking surface in the planar configuration, and fixing a height of the stand.

18. The portable grill assembly of claim 16, wherein at least one of the walls includes a notch for receiving the tip of the collapsible insert.

19. The portable grill assembly of claim 16, wherein at least one of the plurality of hinges of the collapsible insert includes a protruding tip for fitting into a slot mount in at least one of the walls of the collapsible frame.

20. The portable grill assembly of claim 16, wherein the fitting of tips into the slot mounts and the handles engaging the notches in the wall removably attaches the insert to the frame.

* * * * *